(12) United States Patent
Rychlicki

(10) Patent No.: US 7,050,718 B2
(45) Date of Patent: May 23, 2006

(54) METHOD OF ESTABLISHING COMMUNICATIONS IN AN ALL OPTICAL WAVELENGTH DIVISION MULTIPLEXED NETWORK

(75) Inventor: Victor John Rychlicki, 1206 Dressage Ridge, Conyers, GA (US) 30013

(73) Assignee: Victor John Rychlicki, Conyers, GA (US)

( * ) Notice: Subject to any disclaimer, the term of this patent is extended or adjusted under 35 U.S.C. 154(b) by 607 days.

(21) Appl. No.: 10/194,798

(22) Filed: Jul. 13, 2002

(65) Prior Publication Data

US 2003/0020982 A1 Jan. 30, 2003

Related U.S. Application Data

(60) Provisional application No. 60/307,711, filed on Jul. 26, 2001.

(51) Int. Cl.
*H04J 14/00* (2006.01)

(52) U.S. Cl. .............................. 398/57; 398/67; 398/68; 398/48; 398/49

(58) Field of Classification Search ................. 398/56, 398/57, 48–55, 72
See application file for complete search history.

(56) References Cited

U.S. PATENT DOCUMENTS

| | | |
|---|---|---|
| 5,212,577 A | 5/1993 | Nakamura |
| 5,509,010 A | 4/1996 | La Porta |
| 5,526,154 A | 6/1996 | Pyhalammi |
| 5,699,177 A | 12/1997 | Yamamoto |
| 5,781,537 A | 7/1998 | Ramaswami |
| 5,805,593 A | 9/1998 | Busche |
| 5,815,296 A | 9/1998 | Kubotai |
| 5,898,512 A | 4/1999 | Arai |
| 6,044,075 A | 3/2000 | Le Boudec |
| 6,128,291 A | 10/2000 | Perlman |
| 6,307,856 B1 | 10/2001 | Imai |

*Primary Examiner*—David C. Payne

(57) ABSTRACT

A method of establishing communications in an all optical wavelength division multiplexed network. This method is used in networks built from optically connected communication devices (20, 22) that are capable of converting an optical wavelength to at least one other given optical wavelength, and/or directing a given optical wavelength through an ingress and egress port. Communication is facilitated by devices utilizing a set of given optical wavelengths from the electromagnetic spectrum as a carrier to facilitate communication. A plurality of tables (FIG. 2–4) with varying information such as availability, status, functionality, usage, capabilities, and facilities provide a reference for device resources. Communication paths are created between devices by searching the tables (FIG. 2–4) for information regarding available resources needed to create a path, and then utilizing the available resources with or without optical wavelength conversions between devices (20, 22) to construct a communication path. A hardware controller commissions and decommissions device resources as necessary.

18 Claims, 11 Drawing Sheets

METHOD OF ESTABLISHING COMMUNICATIONS IN AN ALL OPTICAL WAVELENGTH DIVISION MULTIPLEXED NETWORK

CROSS REFERENCE TO RELATED APPLICATIONS

This application is based on provisional application Ser. No. 60/307,711, filed on Jul. 26, 2001.

FEDERALLY SPONSORED RESEARCH

Not Applicable

SEQUENCE LISTING OR PROGRAM

Not Applicable

BACKGROUND OF THE INVENTION

This invention relates generally to the field of optical communications and more specifically to method of establishing communication paths, or calls, in an all optical wavelength division multiplexed network.

Telecommunication based networks were developed as an evolution of the technology created to transport a basic phone call; a 64K digital data stream containing voice. T1's were later developed to transport these calls in bulk, T3's after that, and so on. Later, packet technology developed by ARPA (Advanced Research Projects Agency) was adapted to run across these existing facilities for wide spread use by the defense department. Once the value of packet based networking was realized, wide area technology was born, and evolved quickly into the technologies we are familiar with today such as IP, Ethernet, MPLS, ATM, Frame Relay, SONET, and most recently WDM.

All past and present optical communication technologies utilize a given wavelength, usually 1310 nm, to act as a carrier to facilitate a given type of communication, such as MPLS, Frame Relay, SONET, ATM, Gigabit Ethernet, etc . . . Each of these technologies utilize their own 'language' so to speak, to carry out communication functions. SONET uses a 51.84 Mb frame structure referred to as a STS-1 to act as a data transport, ATM utilizes a 53-byte cell to transport data, Frame Relay and Ethernet utilize variable length containers to act as a data transport and are incompatible with each other, as are all of these data transports. All current technologies are also built at the hardware level to conform to specific bit-rate or speeds; for example, SONET typically runs at 155 Mbps, 622 Mbps, 2.488 Gbps and so on in exponential multiples of 51.84 Mbps.

Typically these network infrastructures (MPLS, Frame Relay, SONET, ATM, Gigabit Ethernet, etc . . . ) are built and operated individually and independently. Whenever there is a need to connect or interoperate two or more of these technologies, special considerations must be made, and special hardware must be purchased to allow for conversions between the different technologies. This, in itself, can be a major problem by adding allot of extra complexity to the network, as well as major cost expense.

A recent advancement in communication technology known as Dense Wavelength Division Multiplexing (DWDM), provides significant bandwidth gains and allows incompatible technologies to share a common fiber optic medium by employing multiple wavelengths (or different colors of light) over the same fiber optic cable. Placing different wavelengths of light together over the same fiber optic medium allows us to take advantage of a basic principle of physics. That is, that light of different wavelengths will not interfere, or corrupt each other. This allows us to utilize each wavelength independently of the next. Today we utilize these wavelengths by operating different technologies across individual wavelengths such as SONET on one wavelength, and ATM on another; in this way they can be transported together and not interfere with each other. Another way of utilizing these wavelengths is to run multiple instances of the same technology over the different wavelengths for the purpose of gaining additional bandwidth without having to add additional fiber optic cable to the existing network.

The latest advancement in DWDM technology is known as the Optical Cross Connect (OCX), and allows near real-time switching of wavelengths similar to the way an ATM switch switches cells amongst PVC's. Wavelengths can be switched amongst a number of ports inside a given OCX switch. This is most commonly done now by extremely small mirrors and Micro Electro Mechanical Systems (MEMS) technology. This technology will eventually allow DWDM based networks to be dynamically reconfigured and virtually rebuilt in real time without physical changes to the network itself.

It is the advent of this new technology (OCX) that makes this method possible. Currently there are no methods developed for dynamically utilizing this new technology in a brand new way to create a totally new type of communication system or network. The closest way to accomplish what this method accomplishes today, would be to utilize current and past routing protocols, such as OSPF, RIP, BGP, PNNI, etc . . . to construct communication pathways across a network utilizing OCX switches, and this would limit the overall functionality of the network to operating as they always have; utilizing fixed bit-rates, and incompatible technologies because these protocols were designed for specific technologies. As previously mentioned, past and current technologies are built upon the 64 k digital voice circuit also known as the DS0 (Digital Signaling Level 0). This presents significant limitations in light of what can be accomplished if this new technology (OCX) is utilized in a new way without the limitations of technology that is over 100 years old.

Technologies today (MPLS, ATM, SONET, Frame Relay, Gigabit Ethernet, etc..) all have several things in common; (1) they are bit-rate dependant (only operate at given speeds), (2) they utilize structured transports (like the STS-1, or the Cell) that are incompatible with each other, (3) their transports waste valuable bandwidth, sometimes up to 20%, in order to keep track of user data, identify payload types, and transport signaling or network management information, and finally (3), they are all digital.

By utilizing this method to construct communication paths in a network built on all-optical DWDM and OCX technology, we can create a new type of communication infrastructure, one that does not suffer from these limitations. This new infrastructure is simply a network of lightwaves passed around a fiber-optic network that employees no O-E-O (Optical to Electrical to Optical) technology. A path of light is constructed and utilized as a carrier for whatever type of communication is needed. These optical carriers are constructed between communicating devices and allow any type of communication to be carried out across them, analog or digital. This new infrastructure is transparent to the end user devices attached to it, so the core network itself has no bit rate limitations, and is also blind to the protocol utilizing it such as SONET, ATM, MPLS, etc..

This method combined with the proper technology creates a truly open and generic method of communications that be created to support past, present, and future optical communication needs.

Objects and Advantages:

The primary object of the invention is to provide a method of establishing communication that allows for both digital and analog communication methods.

Another object of the invention is to provide a method of establishing communication that does not limit the speed or bit rate of any communication.

Another object of the invention is to provide a method of establishing communication that allows any given individual communication to be undetectable to any other given communication.

Another object of the invention is to provide a method of establishing communication that will act as a means or carrier for other optical communication technologies, and therefore be backward compatible with other existing optical communication technologies.

A further object of the invention is to provide a method of establishing communication that reduces or removes the need for additional communication information to be added to a primary communication to facilitate, identify, or track the primary communication.

Other objects and advantages of the present invention will become apparent from the following descriptions, taken in connection with the accompanying drawings, wherein, by way of illustration and example, an embodiment of the present invention is disclosed.

SUMMARY

This method describes how to construct communication 'paths' in a communications network built on the technology of All-Optical Cross-Connect Switches, or OCX's as they are referred to in the industry. This network, as stated, must be all-optical, meaning that there is no Optical to Electrical to Optical (O-E-O) conversions carried-out anywhere in the networks infrastructure for amplification, regeneration, re-timing, etc.. To be a bit more specific, this method lays out a new 'call setup protocol' per se, specifically tailored to networks constructed in the afore mentioned manner.

This new protocol, or path construction method, takes advantage of the technical possibilities afforded by this type of network infrastructure. A new protocol such as this is needed because existing protocols are specific to defined types of networks such as MPLS, ATM, SONET, etc. . . This new protocol is blind to these other methods and is therefore open to being used in a whole new manner.

Constructing an optical path via this method is accomplished by referencing tables or listings residing on network devices that comprise information on the devices themselves, and their abilities, functions, status, current state, resources, etc . . . to determine if needed device resources are available to direct a path of light generated by a user access device 22 through the networks core infrastructure 24 to a destination user access device.

This specific wavelength (path of light generated by a user access device (FIG. 1) 22) may or may not require conversion to another specific wavelength as it traverses the core network to its destination user access device 22. Wavelength conversion may be needed in order to traverse a network device that is either unable to support the specific wavelength or is currently utilizing that specific wavelength for another path or function.

A list of possible paths are created by an additional routing protocol (outside the scope of this method) that simply chooses possible routes across the networks core infrastructure 24 between user access devices 22 without any consideration for resources, availability, functionality, etc . . . This method does not detail how this routing protocol should work because it is not necessary, nor is it necessary to create a protocol like this as many exist today. This list of possible paths is simply a starting point for this method to use as a reference.

Each possible path is examined by this method to determine what, if any, resources are available along each of the possible paths between user access devices 22. Once all the possible paths have been examined by this method, the one requiring the least number of wavelength conversions (and therefore the least amount of resources) is selected to be constructed through the networks infrastructure 24. The network devices then commission their hardware to conform to the selected path and communication can then begin.

A plurality of tables and listings, timers, and other functions are utilized to assure that each path creation attempt is completed correctly, or is terminated if a problem should arise in the creation attempt. This method details creating point-to-point, and point-to-multipoint optical communication paths. A table of definitions is included to describe specific features/functions of this method.

DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Figure 1:
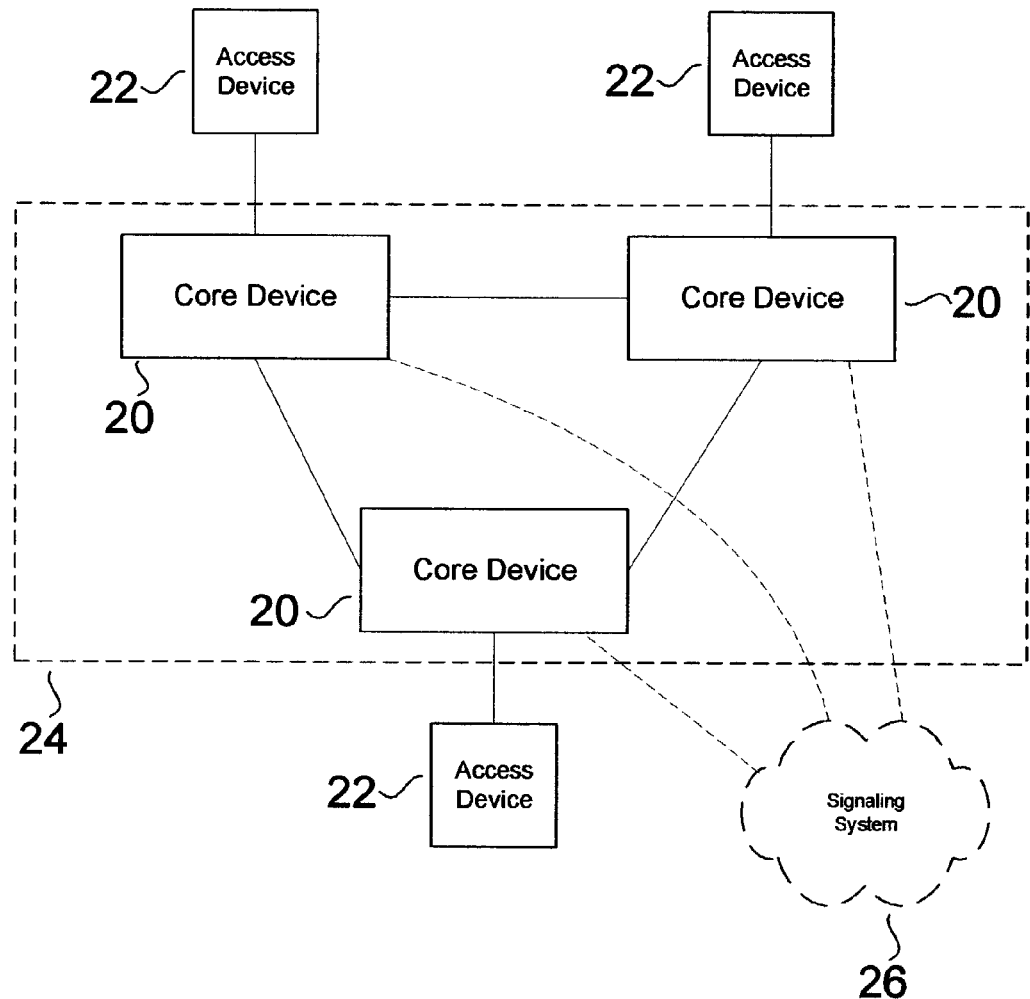
FIG. 1 is a diagram representing the basic layout of a group of connected access and core devices.

REFERENCE NUMERALS 20 representation of a core device
22 representation of an access device
24 grouping know as core network, core infrastructure, or backbone
26 representation of signaling system
28 indicia location for core device address
30 indicia location for port address
32 indicia location for 'ghost' identifier
34 indicia location for in use identifier
36 indicia location for access wavelength identifier
38 indicia location for core wavelength identifier
40 grouping known as switch port wave-table
42 transmit portion of table
44 receive portion of table
46 indicia location for switch identifier
48 indicia location for port identifier
50 indicia location for 'ghost' identifier
52 column for in use indicia
54 column for wavelength identifiers
56 'ghost' identifiers
58 indicia location for core device identifier
60 indicia locations for port identifiers
62 column for wavelength identifiers
64 column for wavelength identifiers
66 step one of method for point to point paths
68 step two of method for point to point paths
70 start of step three for point to point paths
72 start of step four for point to point paths
74 start of step five for point to point paths
76 start of step six for point to point paths
78 start of step seven for point to point paths
80 start of step eight for point to point paths
82 start of step nine for point to point paths
84 start of step ten for point to point paths
86 start of step eleven for point to point paths
88 start of step twelve for point to point paths
90 start of step thirteen for point to point paths
92 start of step one for point to multi-point paths
94 start of step two for point to multi-point paths
96 start of step three for point to multi-point paths
98 start of step four for point to multi-point paths
100 start of step five for point to multi-point paths
102 start of step six for point to multi-point paths
104 start of step seven for point to multi-point paths
106 start of step eight for point to multi-point paths
108 start of step nine for point to multi-point paths
110 start of step ten for point to multi-point paths

DETAILED DESCRIPTION

Detailed descriptions of the preferred embodiment are provided herein. It is to be understood, however, that the present method may be embodied in various forms. Therefore, specific details disclosed herein are not to be interpreted as limiting, but rather as a basis for the claims and as a representative basis for teaching one skilled in the art to employ the present method in virtually any appropriately detailed system, structure or manner.

Introduction:

For purposes of this method, the term 'all-optical wavelength division multiplexed network', or 'all-optical dense wavelength division multiplexed network' is defined as a plurality of interconnected communication devices utilizing a set of given optical wavelengths from the electromagnetic spectrum as a carrier to facilitate communication between a plurality of interconnected communication devices, and will be referred to hereon as 'optical network', or 'communication method' throughout this document. Furthermore, the term 'wavelength' will be taken to mean 'optical wavelength'.

This specification describes a method for establishing communication pathways throughout an optical network. An optical network is also defined, for purposes of this method, as a group of interconnected communication devices whose intention is to communicate with other attached communication devices; in a manner such that all communication across the optical network is carried out by transferring information via wavelengths of light, of any frequency or wavelength, from the first point of entrance into the optical network to the point of exit from the optical network without conversion of the given wavelength(s) to or from an electrical signal.

Figure 4:
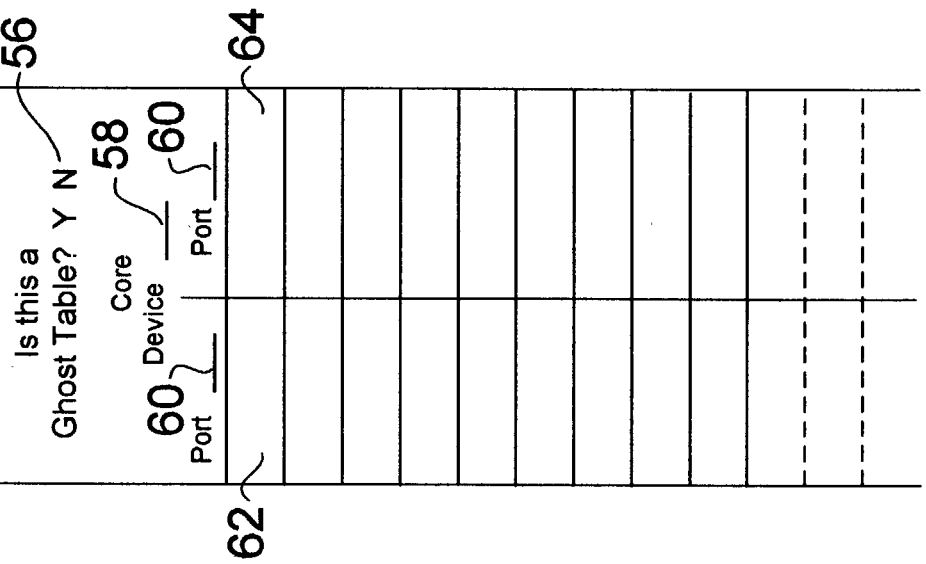
FIG. 4 is a diagram representing one possible construction of a 'temporary switch conversion table'.
Figure 2:
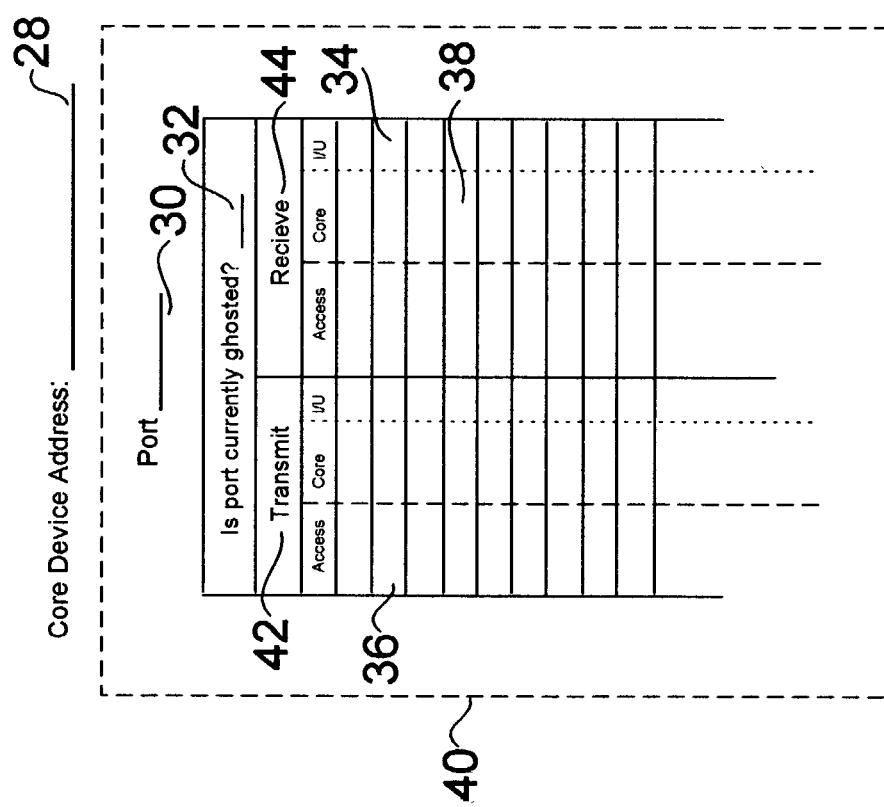
FIG. 2 is a diagram representing one possible construction of an 'access device registration table'.
Figure 3:
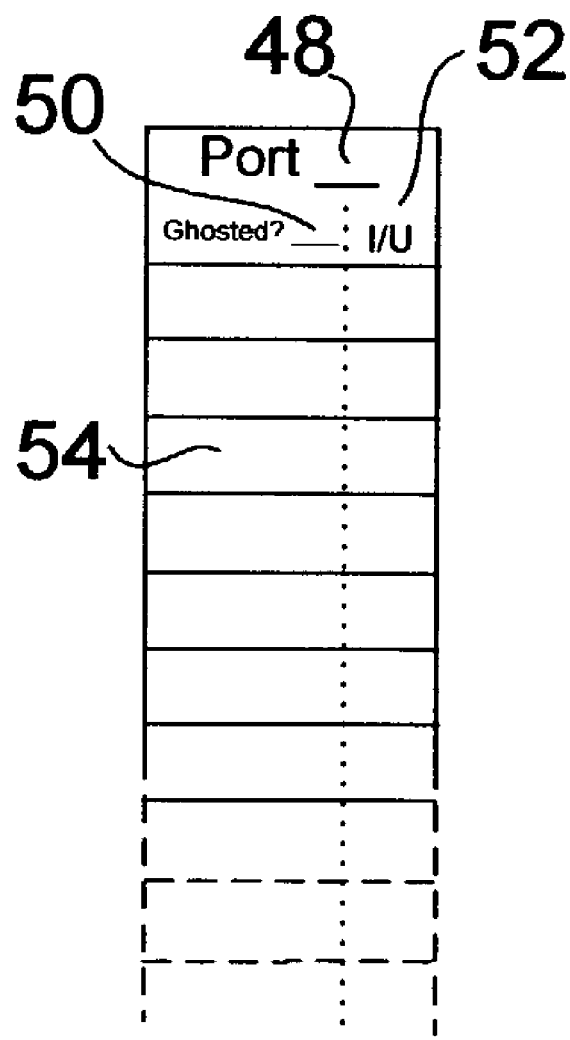
FIG. 3 is a diagram representing one possible construction of a 'switch port wave-table'.
Figure 5:
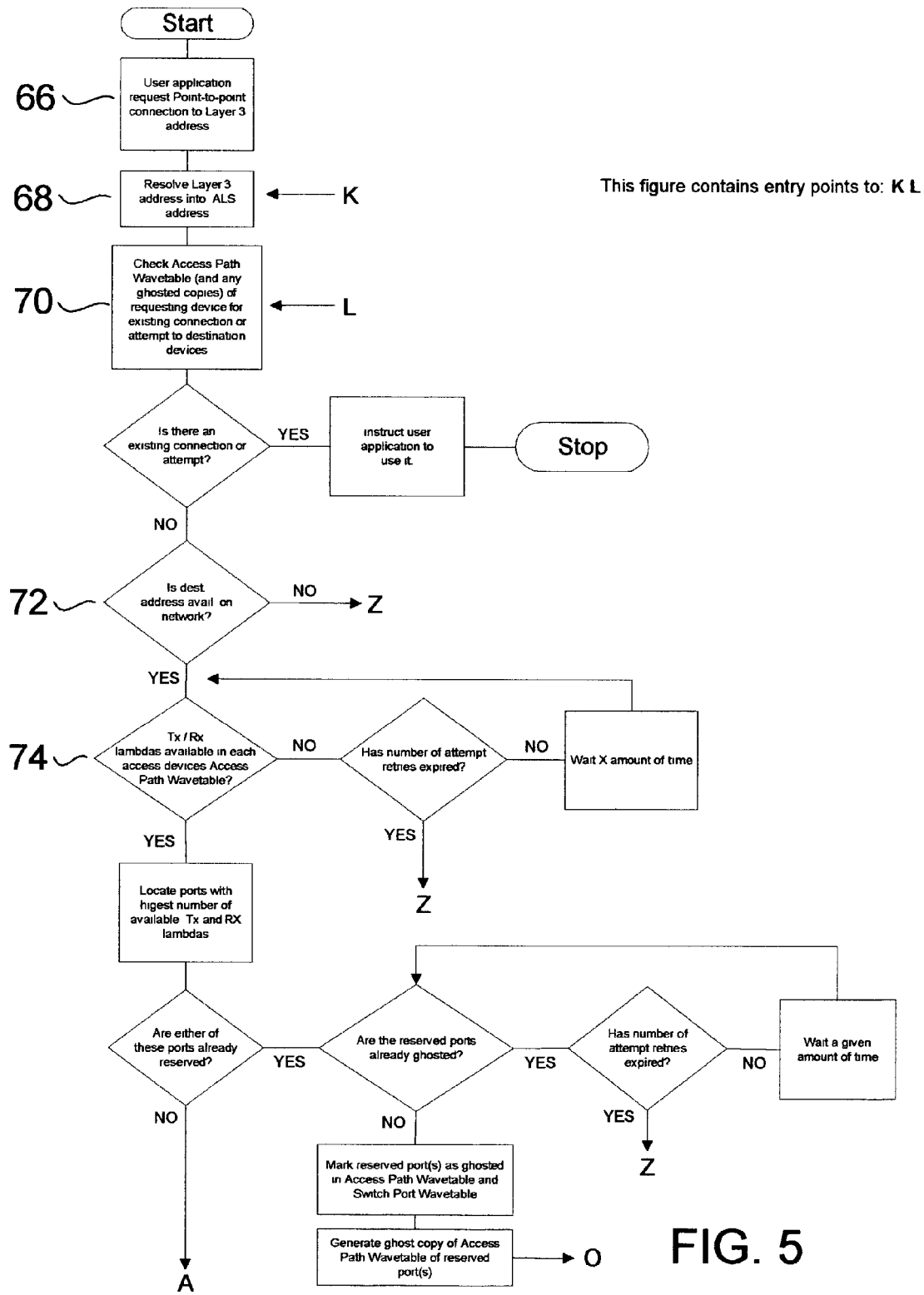
FIG. 5 is a flowchart representing the first portion of the procedure for establishing point-to-point communication paths between two access devices.
Figure 6:
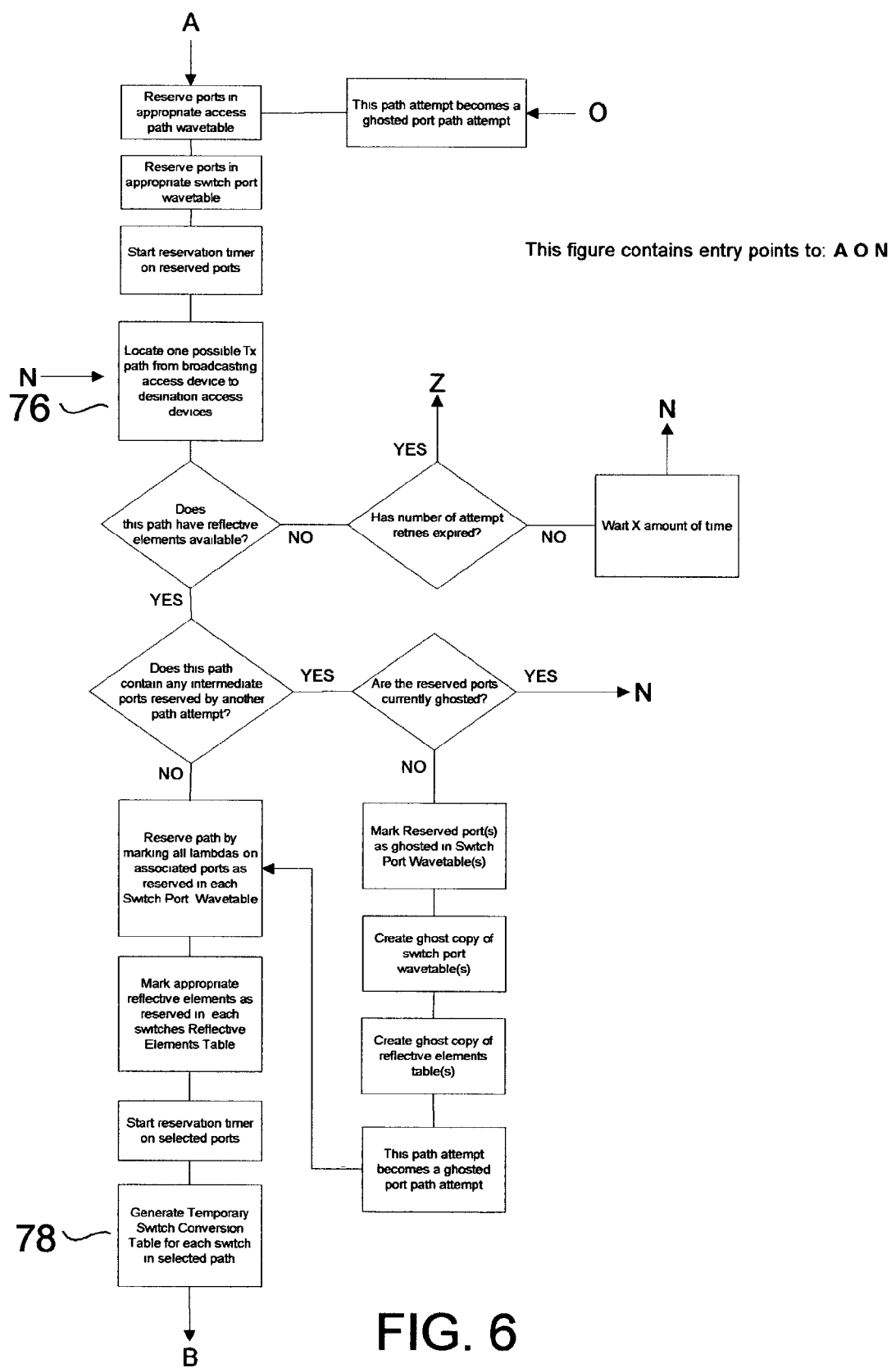
FIG. 6 is a flowchart representing the second portion of the procedure for establishing point-to-point communication paths between two access devices.
Figure 7:
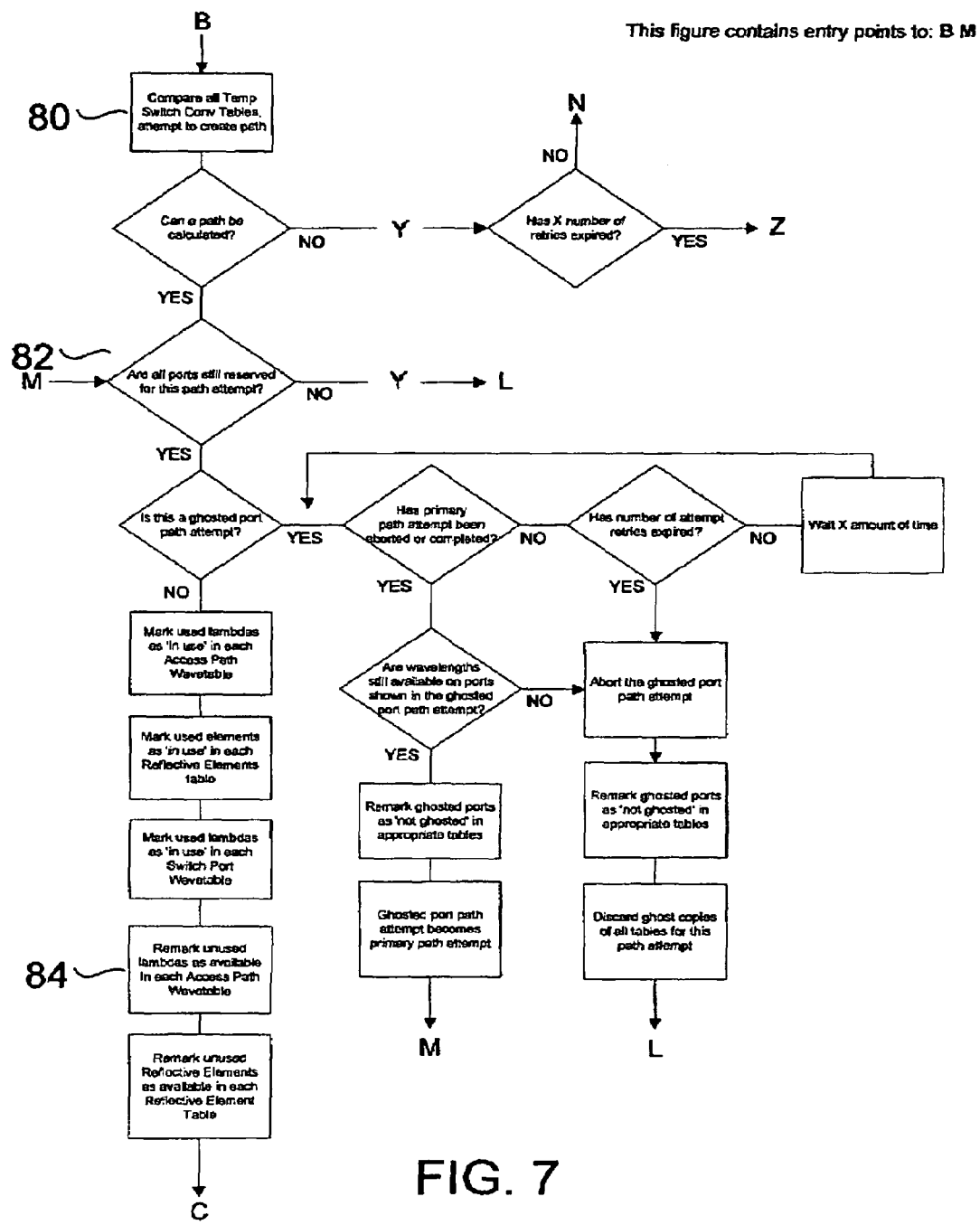
FIG. 7 is a flowchart representing the third portion of the procedure for establishing point-to-point communication paths between two access devices.
Figure 8:
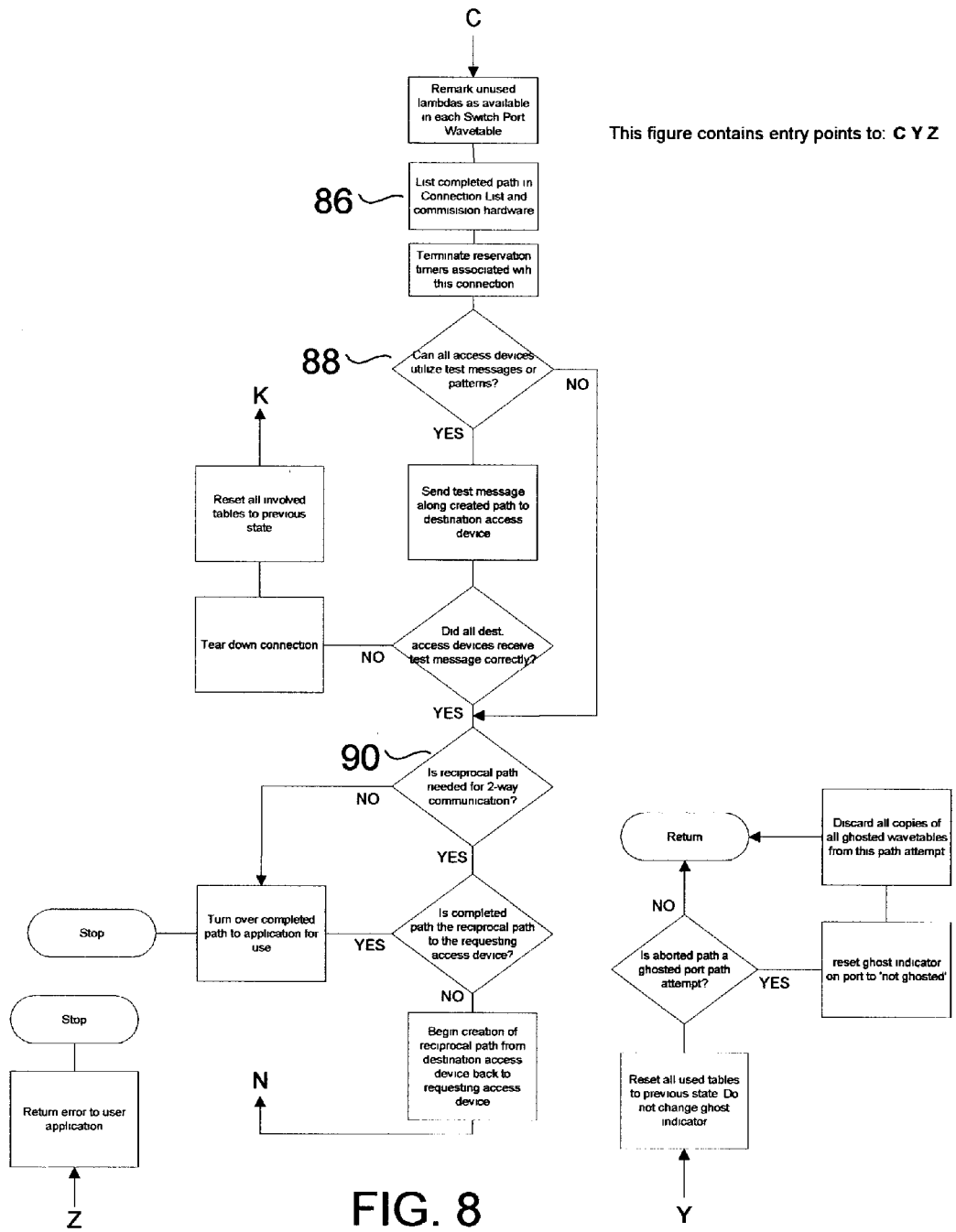
FIG. 8 is a flowchart representing the fourth portion of the procedure for establishing point-to-point communication paths between two access devices.
Figure 9:
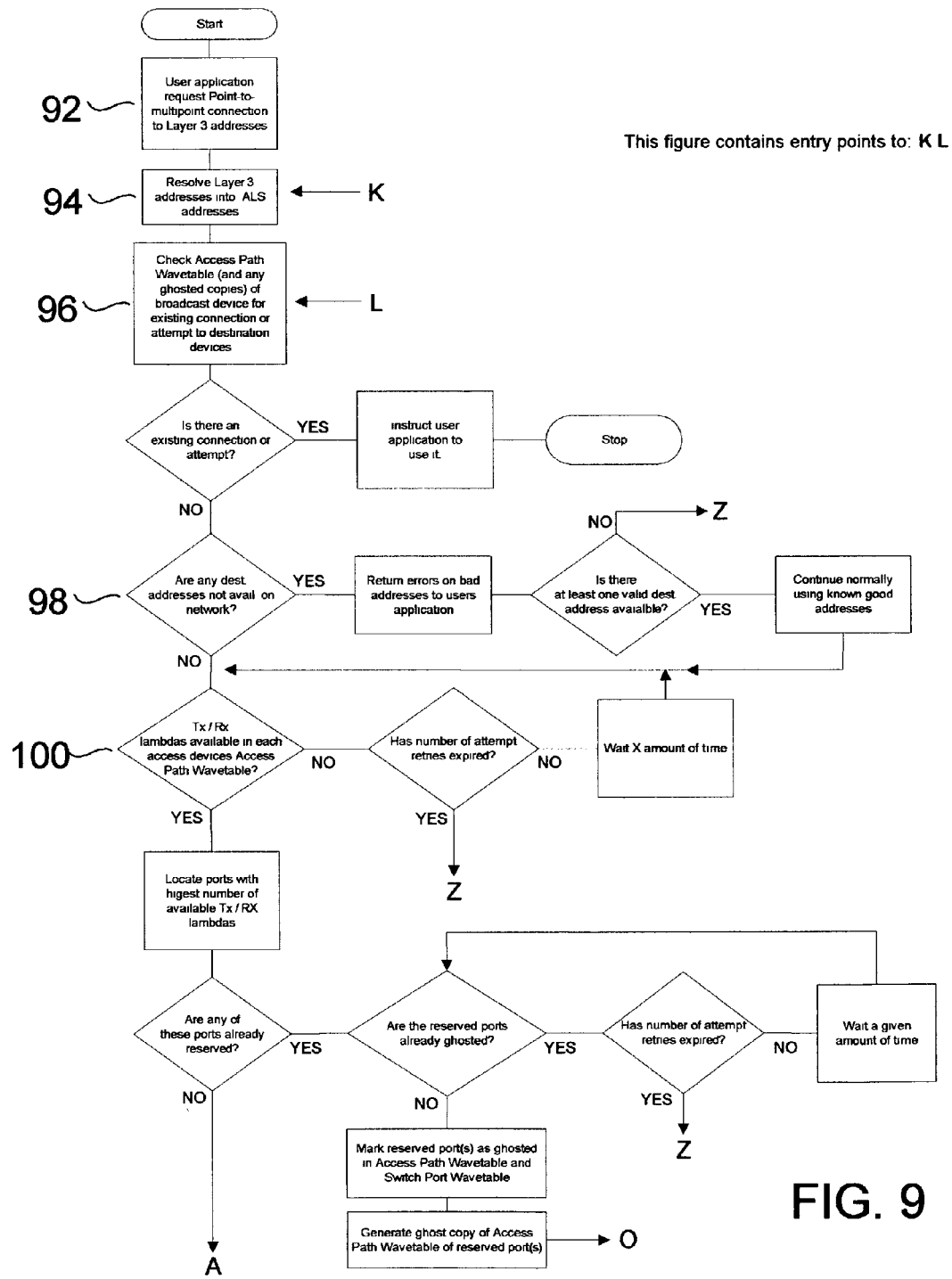
FIG. 9 is a flowchart representing the first portion of the procedure for establishing point-to-multipoint communication paths between two or more access devices.
Figure 10:
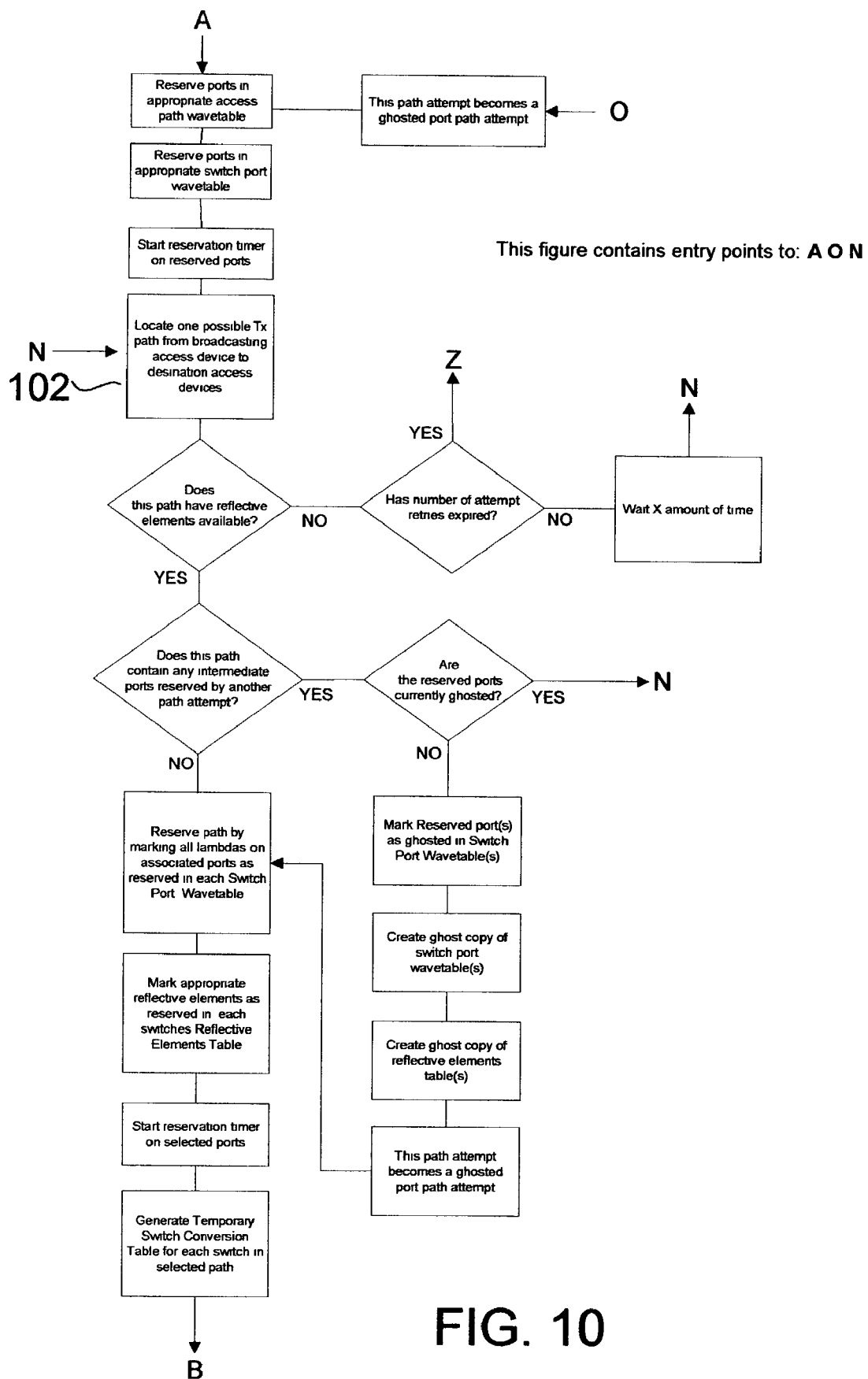
FIG. 10 is a flowchart representing the second portion of the procedure for establishing point-to-multipoint communication paths between two or more access devices.
Figure 11:
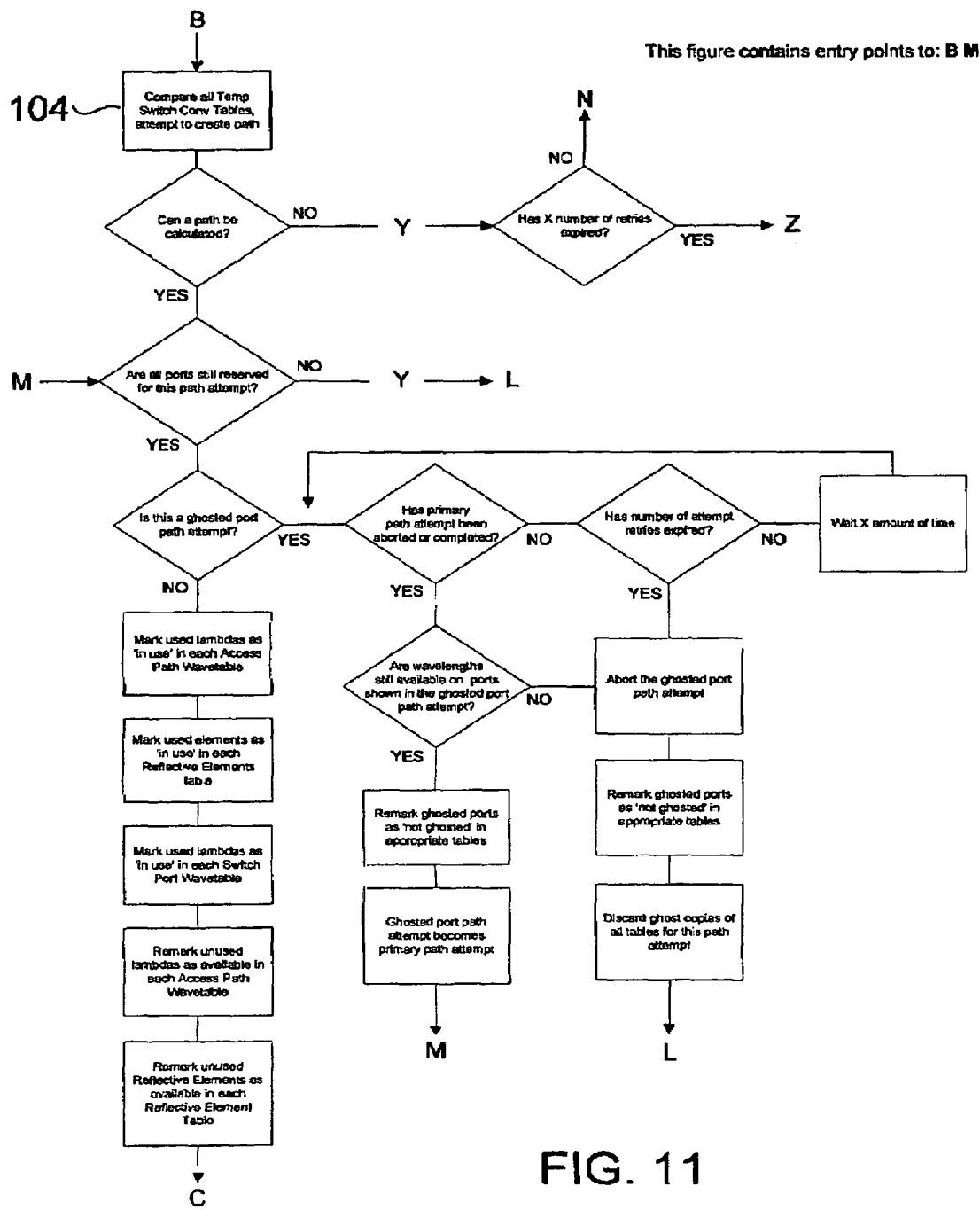
FIG. 11 is a flowchart representing the third portion of the procedure for establishing point-to-multipoint communication paths between two or more access devices.
Figure 12:
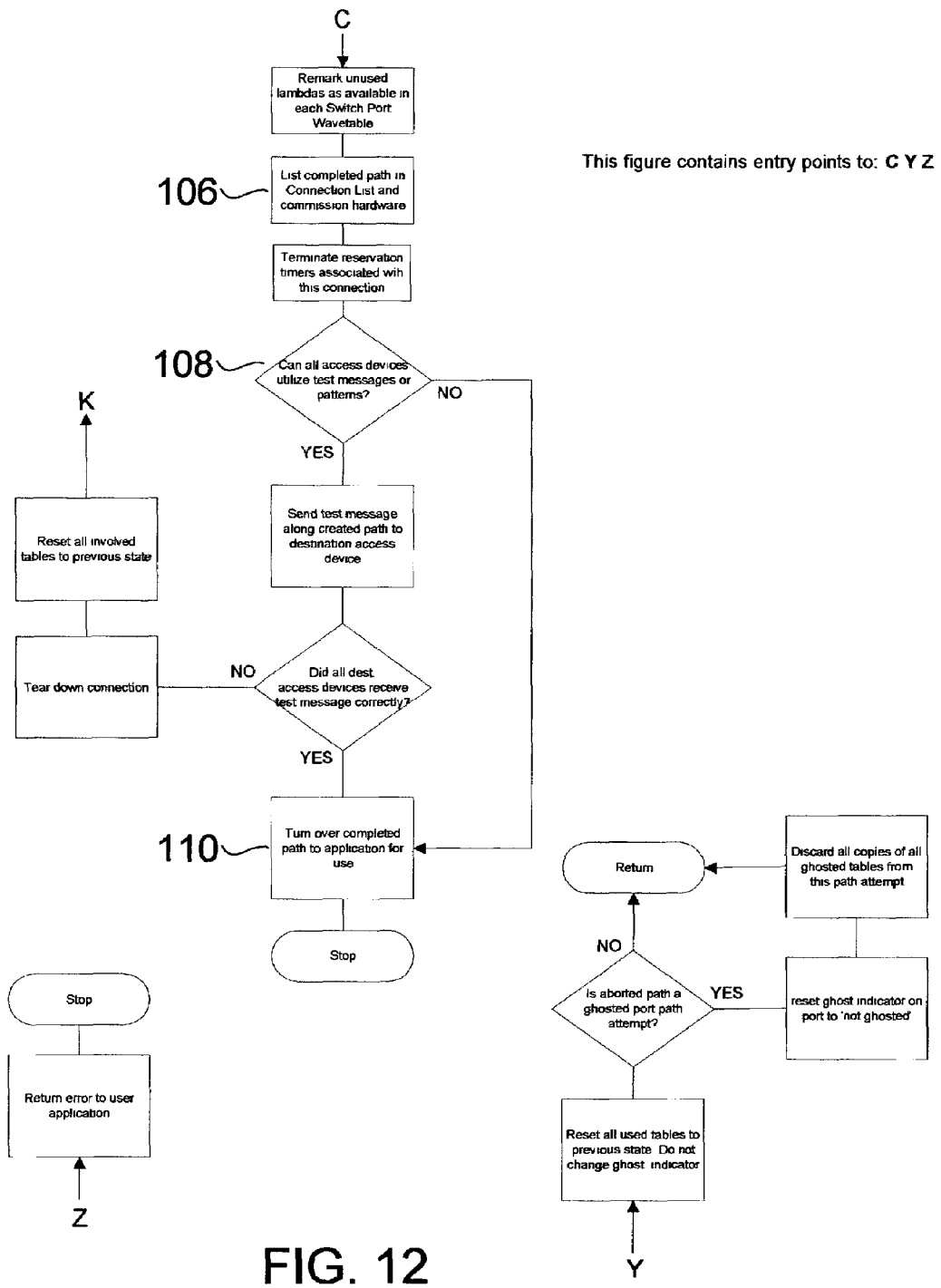
FIG. 12 is a flowchart representing the fourth portion of the procedure for establishing point-to-multipoint communication paths between two or more access devices.

A plurality of differing tables and listings FIG. 2–4 comprising varying information such as availability, status, functionality, usage, capabilities, facilities, and related notations or indicia, are utilized along with a timer method, to assure that each path creation attempt is completed correctly, or executes a corrective method such as terminating a connection attempt if a problem should arise in the creation attempt.

This method details creating point-to-point, and point-to-multipoint optical communication paths. A table of definitions is included to describe specific features/functions of this method.

This method is designed specifically for optical networks built on technologies such as Optical Cross Connects (OCX), Raman, and Erbium Doped Fiber Amplifiers (ED-FAs').

An OCX is a device that is capable of directing wavelengths through and ingress and egress method such as a port, and converting an optical wavelength to at least one other optical wavelength while maintaining the wavelength in an optical state. An infrastructure built upon these and other compatible technologies that do not require Optical to Electrical to Optical (OEO) conversions of wavelengths for maintenance can be utilized in a new manner to create a new type of network infrastructure.

This new protocol, or path construction method, takes advantage of the technical possibilities presented by this type of network infrastructure, and may therefore also be utilized as a machine by including this method in at least one device comprising resources such as a memory capable of storing tables and listings in proper adjacent memory locations, a memory controller for executing instructions as required, a hardware controller which will commission and decommission device resources as needed, and other appropriate devices or subparts to operate and execute this method and its intended results.

Advantages:

From the following sections below, a number of advantages of this method of establishing communications in an all optical wavelength division multiplexed network become evident:

(a) This method allows for communications utilizing any technology that produce given wavelengths. For example, analog and digital communication methods are supported.

(b) Communications may be carried out at any speed or bit rate because there is no need for OEO conversions.

(c) Given the physical nature of electromagnetic wavelengths, individual communications on given wavelengths are not affected by other communication on other given wavelengths. This provides inherent security for individual communications utilizing this method since they are undetectable to each other.

(d) Due to the open and generic manner of this method, and the technology it is designed for, an optical network utilizing this method may act as a carrier for other optical communication technologies, and therefore be backward compatible with existing optical communication technologies.

(e) This method reduces or removes the need for additional information, or overhead, to be added to user data, to facilitate, identify, or track the users' communication or data. Further, it may not require information other than that of the users to traverse the paths created between user access devices for use by the user.

FIG. 1–4: Definitions

The Following Terminology is Used Throughout this Document:

Term: Access Device (FIG. 1) 22

Definition: Devices that allow access to a network core infrastructure or backbone 24. These devices typically interface between the optical networks infrastructure and another device, or devices facilities or infrastructure. The functions of these devices are not solely dedicated to the operation of the optical network. These devices can translate between a human users' device, such as a personal computer, and the optical networks infrastructure. Access devices are devices consisting of appropriate methods of connecting to the optical network and another device, or devices, for purpose of translation between them. Access devices may be built as individual stand-alone devices or as a part of another device. Access devices always connect to core devices, and will never connect to other access devices. Access devices directly connect to the optical network infrastructure via fiber optic ports. Access devices have memory to store tables and listings and also have a memory controller, and a hardware controller to translate and carry out instructions from the optical networks programming or operating system.

Term: Core Device 20

Definition: Devices that make up the main infrastructure, or backbone 24, of the optical network. Core devices consist of any device whose functions are solely dedicated the operation of the addressed network. Core devices can also be further defined as devices that do not have the ability to support human user type interfaces such as personal computers for example; or devices that are consistent with other technologies that are not specifically the same as the optical networks technology. Examples of core devices typically include core switches, repeaters, and regenerators. Core devices always connect to other core devices and may or may not have access devices directly connected to them.

Core device are directly connected to other core device via fiber optic ports and therefore create the main portion of the optical network transport infrastructure. Core device have memory to store tables and listings and also have a memory controller, and a hardware controller function to translate between access devices and the optical networks infrastructure of which the core device 20 is a part. Core device maintain and execute the optical networks programming or operating system via memory, memory controller(s), and hardware controller(s).

Term: Port

Definition: This term, or any other term agreeing with this definition refers to an individual interface on an access device 22 or core device 20. This interface is connectable to any another like interface on the optical network via a single strand of fiber optic cable. This port is capable of either or both transmit and receive functions.

Term: Access Spectrum

Definition: This term, or any other term agreeing with this definition refers to the wavelengths, range of wavelengths, or ranges of wavelengths, in the electromagnetic spectrum that access device 22 ports use to perform the transmit and receive functions that facilitate the communication process.

Term: Core Spectrum

Definition: This term, or any other term agreeing with this definition refers to the wavelengths, range of wavelengths, or ranges of wavelengths, in the electromagnetic spectrum that core device 20 ports use to perform transmit and receive functions that facilitate the communication process.

Term: Path

Definition: This term, or any other term agreeing with this definition refers to a one-way communication connection between access devices. A path is built from one access device 22, across the networks infrastructure of core devices 20, to another access device 22 utilizing wavelengths, or conversions between different wavelengths along the path to facilitate one-way optical communication. Two paths are required for two-way communication between access devices.

Term: Signaling System 26

Definition: This term, or any other term agreeing with this definition, for purposes of this method, is a packet network that runs across its own dedicated wavelengths(s). The signaling system 26, or packet network executes on core device throughout the entire optical network infrastructure and is transparent to users' and user applications utilizing other wavelengths. It is responsible for all calculations and functions associated with the setting up and tearing down of communication paths, and communicating related information to network devices. The signaling system 26 also has many other responsibilities that are outside the scope of this method.

Term: Primary Path Attempt

Definition: This term, or any other term agreeing with this definition refers to a path creation attempt that takes place among ports that are currently available for new connection attempts and therefore not reserved or restricted from being utilized by a new connection request in any way.

Term: Ghosted Port Path Attempt

Definition: This term, or any other term agreeing with this definition refers to a secondary path creation attempt, or secondary process that takes place while ports are busy attempting a 'primary path attempt'. The ghosted port path attempt cannot create a path until the primary path creation attempt has completed; it can however, calculate and record a possible path, which can be created once the primary path creation attempt is complete. This definition does not limit a port(s) to only allowing one ghosted port path attempt execute at a given time on a port. This method describes the process of utilizing one ghosted port path attempt on a port at a time; executing multiple ghosted port path attempts on a given port at a given time would not be outside the scope of this method.

This definition can be further defined as a method of secondary process by determining at least one possible optical communication path during the execution of determining at least one possible optical communication path, and by making appropriate notations in the tables or listings to identify the method of secondary process, and further generating additional copies of the needed tables or listings for use by the secondary process.

Term: Access Device Registration Table FIG. 2

Definition: This term, or any other term agreeing with this definition refers to a table generated for each access device 22 detected on the optical network; this table contains the address 28 of the core device 20, and an 'access path wave-table' 40 for each port 30 on the core device 20 to which an access device 22 is attached. This table resides on the core device(s) 20, devices to which the access device 22 is attached.

This definition can be further defined as a table or listing comprising information regarding a given device, or device subpart by its network address or identifier, and other related information regarding each port of the given device comprising the secondary process status, and capabilities of converting given optical wavelengths to other given optical wavelengths.

Term: Access Spectrum Wave-Table (not shown)

Definition: This term, or any other term agreeing with this definition refers to a table that resides on an access device 22. The table contains information detailing the available wavelengths, and function or functions those wavelengths are capable of performing, on each port of the access device 22. This table or its information is typically transmitted to the signaling system 26 to aid in the creation of an 'access path wave-table' 40 for each port of the access device 22.

This definition can be further defined as a table or listing comprising information regarding optical wavelengths and their functions relating to ports of a given device.

Term: Access Path Wave-Table 40

Definition: This term, or any other term agreeing with this definition refers to a table created for each indicated port 30 of an access device 22. This table contains a list 36 of all 'access spectrum' wavelengths the access device 22 supports per port 30, based on transmit and receive functions that can be successfully converted to and listed as 38 'core spectrum'. The table also shows which wavelengths are available, in use, or reserved 34; this table also indicates whether or not the assigned port has a 'ghosted port path attempt' currently in process 32. This table resides on the core device 20 or devices to which the access device 22 is connected.

This definition can be further defined as a table or listing for a given device comprising information regarding secondary process status, and capabilities regarding converting given optical wavelengths to other given optical wavelengths with relation to given device subparts.

Term: Switch Port Wave-Table FIG. 3

Definition: This term, or any other term agreeing with this definition refers to a table listing wavelengths 54 supported on each indicated port 48 of a given core device 20 shown 46, and which wavelengths 54 are in use 52 at any given time; this table also indicates which, if any, of the core device 20 ports 48 have a 'ghosted port path attempt currently in process 50. This table typically, but is not required to, resides on core device.

This definition can be further defined as a table or listing comprising information regarding optical wavelengths, the status of the optical wavelengths, and associated ports of a given device.

Term: Temporary Switch Conversion Table FIG. 4

Definition: This term, or any other term agreeing with this definition refers to a reference table generated during a path creation attempt or 'ghosted port path attempt' as indicated 56 that shows which indicated ingress 62 and egress 64 core spectrum wavelengths, or wavelength conversions to other wavelengths, are unused and can be supported across chosen ports 60 in each indicated 58 core device 20 along a chosen possible path. This table also indicates whether or not it was generated as a result of a 'ghosted port path attempt'. This table typically, but is not required to, resides on core device.

This definition can be further defined as a reference table for a given device created by gathering and arranging information from the tables or listings regarding optical wavelengths, options for converting given optical wavelengths to other given optical wavelengths, availability of the optical wavelengths with respect to associated ports of a given device, and secondary process status.

Term: Reflective Elements Table (not shown)

Definition: This term, or any other term agreeing with this definition refers to a table listing all reflective elements, such as mirrors or bubbles (dependant on the technology of the given device) for example, in a given core device 20; this table tracks which reflective elements are currently in use, and how they are being used with respect to the same core device ports of the wavelengths they are deflecting. This table typically, but is not required to, resides on core device.

This definition can be further defined as a table or listing comprising information regarding at least one of the following: status, availability, functionality of a given device or device subparts.

Term: Connection List (not shown)

Definition: This term, or any other term agreeing with this definition refers to a listing that displays all paths currently completed and in operation throughout the given optical network. This table typically, but is not required to, resides on core device.

FIG. 1–2: Preliminary Operation

Addressing of Optical Network Devices:

The definitions and functions of the terms defined in this documents 'table of definitions' are within the scope of this method; however the terms chosen to represent each definition are not within the scope of this method and may be chosen at random.

Addressing of Access Devices:

Before any communication paths can be built across the optical network infrastructure, or backbone 24, all devices participating in the optical network must be given an address to facilitate the location of these individual optical devices inside, or attached to, the optical networks infrastructure, or backbone 24. Any addressing method that will function within the scope of this method may be employed to assign addresses to devices participating in the optical network to which this method applies.

Registration of Access Devices:

Before an access device 22 can begin requesting paths across an optical network built to function within the scope of this method, it must be registered with the signaling system 26 of the optical network. This is done as follows:

The access device 22 is given an address appropriate to the chosen addressing method for the optical network to which the access device 22 is to participate. Once the access device 22 has been assigned an appropriate address; the address information is placed in an 'access device registration table' FIG. 2 that resides on the directly connected core device(s) 20. Core devices hold registration information for all access devices directly connected to the given core device 20.

The attached access device 22 must communicate to the signaling system 26 the range of 'access spectrum' wavelengths it is capable of supporting. All wavelengths for both transmit and receive functions for each port of the access device 22 must be communicated to the signaling system 26. This listing is the 'access spectrum wave-table' (not shown). This may be communicated to the signaling system 26 by either of three methods: a) the access device 22 may directly communicating to the signaling system 26 the entire 'access spectrum wave-table'; b) the access device 22 may communicate to the signaling system 26, wavelength-by-wavelength, the supported wavelengths for each of the transmit and receive function per port; or c) the access device 22 may communicate to the signaling system 26 a particular standardized number or notation that specifies a range or listing of supported wavelengths for each function per port.

The signaling system 26 will then compare the transmitted wavelength information for each port of the access device 22 to each corresponding port of the core device 20 to which the access device 22 is attached. The purpose of the comparison is to compile a new listing of wavelengths the core device 20 is capable of converting from 'access spectrum' to 'core spectrum' on each port of the core device 20 to which the access device 22 is connected. From the comparison is derived wavelength information, such as the length and/or frequency of the wavelength or other suitable identifier; to be placed in an 'access path wave-table' 40 corresponding to each port shown 30 of the core device 20 to which the access device 22 is attached. These 'access path wave-tables' 40 contain all 'access spectrum' wavelengths listed 36 the access device 22 supports per port based on transmit 42 and receive 44 functions that can be successfully converted to and listed as 38 'core spectrum'. The 'access path wave-table' 40 will show all possible combinations of individual wavelength conversions between 'access spectrum' 36 and 'core spectrum' 38 for each port referenced 30 to which the access device 22 is connected. The 'access path wave-table' 40 listing will be split into transmit 42 and receive 44 sections.

Wavelengths listed in the 'access path wave-table' 40 may be identified as currently being utilized, by listing the destination access device 22 address in relation to the wavelengths used to communicate with the destination access device 22 in the appropriate column 34, or by utilizing any other notation or indicia that accomplishes the same usable results, throughout this method. Any other appropriate method would not be outside the scope of this method.

The 'access path wave-table' 40 listings may be generated by either of two methods: a) an algorithm may generate the combinations dynamically based on the functionality of the given core device 20 and the abilities of the given access device 22, such as, but not limited to a simple comparison, or b) via an exchange of codes or notations between the access device 22 and the directly attached core device 20 that represent a listing or standardized available conversions.

The 'access path wave-table' 40 information is added to the 'access device registration table' FIG.2 for the appropriate core device 20 address 28, and is listed by core device 20 port number 30. The 'access device registration table' FIG.2 contains 'access path wave-tables' 40 for each access device 22 port connected to a given core device 20 port 30; it also identifies wavelengths as to their utilization 34, and notates whether or not any given port(s) has a 'ghosted port path attempt' in progress 32.

FIG. 1–12: Operational Steps:

Establishing Point-to-Point Communication Paths Between Two Access Devices:

The following procedure or process outlines the method of establishing communication paths across an optical network between access devices for purpose of one-way unidirectional, or two-way bi-directional communication. The flowcharts in FIGS. 5–8 detail this process.

Step One. (FIG. 5) 66 The application or process executing on the users' interface device or other appropriate device or process, sends a request through the access device 22 to the signaling system 26 of the optical network to establish either a two-way point-to-point communication path, or a one-way point-to-point communication path to an acceptable destination address. The destination address format may or may not be integrated as a part of the optical network to which this method applies itself, but rather may be operable with the optical network to which this method applies thru a translation or reference process. This could apply to an optical network built supporting a well-known Open Systems Interconnect (OSI) Layer three addressing system such as TCP/IP for example.

Step Two. 68 The signaling system 26 receives the requested destination address and translates or references it, if necessary, to an optical network device hardware address.

Step Three. 70 The signaling system 26 then checks the 'access path wave-table' 40, and any copies of the 'access path wave-table' 40 generated by a 'ghosted port path attempt', of the requesting access device 22 to see if there is already a connection or connection attempt in progress to the destination access device 22. If there is an existing connection or connection attempt, instruct the access device 22 to utilize it if it is already complete, or instruct the access device 22 to utilize it once it has been completed, then terminate the connection attempt. If there is no current or planned connection attempt in progress proceed with the following steps.

Step Four. 72 The signaling system 26 checks to see if the requested destination address is available on the specified optical network. This check may be done by referencing the 'access device registration tables' FIG. 2 on each core device 20, or by referencing summarized 'access device registration tables' on given core device throughout the given network; this check may also be done by any other method that yields the same results; other such methods would not be outside the scope of this method. If the destination address is not available on the specified optical network, return an appropriate error to the users' application or process that initiated the original connection request and terminate the path creation attempt.

Step Five. 74 The purpose of this step is to check to see if each of the requesting and destination access devices have one or two available unreserved wavelengths, one for transmit, and one for receive (if necessary), available in their associated 'access path wave-tables' 40. If available wavelength(s) are found on the requesting and destination access devices, the associated device ports are reserved via any usable reservation indicia, preferably via indicia that indicates a specific path connection attempt.

If an access device 22 has multiple ports and more than one of them contain available transmit and/or receive wavelengths, the ports with the most available transmit and/or receive wavelengths should be reserved. If the needed wavelengths are not available on any port of the requesting access device 22 and destination access device 22, wait a pre-determined amount of time, utilizing a timing mechanism, and try again a given number of times; if there are still no appropriate transmit/receive wavelengths available after the given number of attempts has expired, re-check to determine if any other ports have become available, if so utilize the port; if not, return an appropriate error to the users' application or process that initiated the original connection request and terminate the path creation attempt.

If no other ports are available and there are unused wavelengths on ports that are currently reserved and no other ports are available for use, check the reserved ports 'access path wave-table' 40 to determine if the port currently has a 'ghosted port path attempt' in progress; If so, wait a given amount of time and try again. Once the 'ghosted port path attempt' has turned into a 'primary path attempt' (during step nine) another 'ghosted port path attempt' can proceed. Each access device 22 port, or core device 20 port can support one 'primary path attempt' and a minimum of one 'ghosted port path attempt' at the same time. If the numbers of attempt retries expire, this would indicate a problem with the 'primary path attempt' or the 'ghosted port path attempt'. Return an appropriate error to the users' application or process that initiated the original connection request and terminate the connection attempt.

If no 'ghosted port path attempt' is in progress on the reserved ports on either access device 22, one may be initiated. The requested ports 'access path wave-table' 40 and corresponding port listings in the 'switch port wave-table' FIG. 3 should be marked to indicate 32 50 that a 'ghosted port path attempt' is in progress. A copy hereon referred to, as a 'ghost' copy of the 'access path wave-table' 40 should be generated to work from during the 'ghosted port path attempt'. A 'ghosted port path attempt' is basically a guess at which wavelengths will not be used by a given port or ports during a 'primary path attempt'.

Since we cannot formally reserve wavelengths that are already reserved by another path attempt, we can make a reasonable guess at which ones will be available once it has completed. The 'ghosted port path attempt' is calculated exactly as stated below in the following steps with the noted exceptions. The signaling system 26 will calculate a 'ghosted port path attempt' independently of the current 'primary path attempt' using a ghost copy of the 'access path wave-table' 40 and/or 'switch port wave-table' FIG. 3 as appropriate, of the reserved port. If a port is being 'ghosted', meaning there is a 'ghosted port path attempt' in progress on the port, there will be a notation in the 'access path wave-table, and/or 'switch port wave-table, as appropriate for the associated port.

Once the 'primary path attempt' has completed, the 'ghosted port path attempt' becomes the 'primary path attempt'. As long as the settings generated by the 'ghosted port path attempt' do not conflict with those chosen by the previous 'primary path attempt', the settings can be applied to the appropriate tables and the path can be constructed. If the chosen 'ghosted port path attempt' settings conflict with the previous path attempt, the 'ghosted port path attempt' will be aborted, and the path creation attempt will begin again at step three.

Only the selected ports that contain the found transmit and receive wavelengths on each access device 22 should be reserved in the 'access path wave-table' 40, 'switch port wave-table' FIG. 3 or any ghost copies of these tables as appropriate. The ports are reserved by marking all available wavelengths on the associated port(s) 30 48 as being reserved for the destination access device 22. The reservation notation can most effectively be done by listing the address of the destination access device 22 along with a notation that identifies the port as being reserved in the appropriate columns 34 52; this may also be done by any other method that yields the same results usable throughout this method. The reserved port(s) on the destination access device 22 should also be marked accordingly as reserved for the source or requesting access device 22. Basically, the access device ports are reserved in the name of the opposite access device 22.

Once the associated port(s) have been reserved on each access device 22, a timing mechanism utilized as a reservation timer should be set. If the requested connection is not completed in a given amount of time (timer expires), the 'access path wave-tables' 40 showing reserved wavelengths on each of the source and destination access devices should be reset as described later in this document and all associated wavelengths should be reset to showing as available. This is done to prevent any ports from being 'locked out' from other path attempts in case of a path construction failure of any type. If a 'ghosted port path attempt' begins on a selected port, a ghost reservation timer (timing mechanism) should also be set in the same manner for the same reason.

Step Six. (FIG. 6) 76 The signaling system 26 will then, for the requesting access device 22, determine and reserve one possible previously selected transmission path (hereon referred to as 'predetermined') across the optical network infrastructure, or backbone 24 to the other access device 22. Start with the reserved port on the requesting access device 22 with a wavelength that can be utilized for transmit, and end with a reserved port on the destination access device 22 that has a wavelength that can be utilized for receive. This predetermined path determination will typically be accomplished via a routing protocol that will be integrated into the signaling system 26; this routing protocol is outside the scope of this method.

If this is a 'ghosted port path attempt' initiated due to a reserved access device 22 port, attempt to locate a predetermined transmission path that is different from the current 'primary path attempt' that utilizes the same reserved ports, on the access devices selected in step five. This will increase the chances of success for the 'ghosted port path attempt'.

This predetermined transmission path should contain ports on all core device along the chosen path that: a) have reflective elements available for use to direct a wavelength from the transmission source toward the transmission destination along the selected path, and b) are not already 'reserved' by another path creation attempt. If a selected port or ports are reserved by another path creation attempt, the 'ghosted port path attempt' process may be employed to allow for multiple connection attempts on the reserved ports.

A reflective element is not available when: a) it has all available 'core spectrum' wavelengths shining across it, on it, or from it: b) is directed to reflect light for existing connection(s) in a direction other than is needed for the current path creation attempt, and therefore cannot also be utilized for the current path creation attempt; c) is listed as 'unavailable' by the signaling system 26 for any reason; or d) is being used in any manner that prohibits its use for the current path creation attempt.

A reflective element is available when: a) it does not have all available 'core spectrum' wavelengths shining across it, on it, or from it; b) it is adjusted in a manner that properly reflects light from the transmission source toward the transmission destination although it may currently have some wavelengths shining across it, on it, or from it; c) it is unused in any way and can be adjusted as necessary to help establish the current path connection attempt; and d) it is not marked as 'unavailable' by the signaling system 26.

The signaling system 26 will be tracking the use of all reflective elements on each core device 20 by monitoring the reflective properties of all reflective elements on the given core device 20 with respect to the ports using the reflective element. A given reflective element may be deflecting wavelengths from one or more ports to one or more ports. Each core device 20 containing reflective elements will maintain a table or listing (not shown) that track this usage in real time. The 'reflective element table' (not shown) or appropriate list contents and structure will depend on the technology and construction of the given core device 20, but must be laid out in a manner that allows the signaling system 26 to determine if one or more reflective elements is available to deflect a wavelength from a given ingress port to a given egress port.

If a suitable predetermined transmission path with available reflective elements cannot be located, wait a given amount of time and try along a different path a given number of times. If after the retry attempts have expired, a path with available reflective elements cannot be found, return a suitable error to the users' application or process that initiated the original connection request and terminate the path creation process and discontinue the connection attempt. On a larger optical network it will probably not be necessary to wait before a retry attempt since there will likely be other routes or paths available through the optical network. Smaller optical networks may not have so many options for routes through an optical network therefore waiting will give other connection attempts a chance to finish up and free resources.

To determine if any ports have already been reserved by another connection attempt, check the port listing in the associated core devices 'switch port wave-table' FIG. 3 for ports 48 that have all wavelengths marked as reserved, or in-use in the appropriate column 52. If no ports having all wavelengths marked as reserved are found, the requested port 48 is available. If intermediate reserved ports (ports between the already reserved core device 20 ports connected to access devices) are found along the chosen path, check the appropriate 'switch port wave-table' FIG. 3 location 50 to see if the port(s) are currently ghosted; if so, begin again at this step and select another possible transmission path. If the selected port(s) are reserved but not ghosted: a) mark them as ghosted 50 in the appropriate 'switch port wave-table' FIG. 3; b) generate ghost copies of the 'switch port wave-table' FIG. 3 to continue working from; c) generate ghost copies of the 'reflective elements tables' (not shown) to continue working from; d) this path will now become a ghosted port path attempt; and e) proceed normally with noted exceptions for 'ghosted port path attempts'.

Once a predetermined path as described above has been located, it must be reserved. This is done by: a) marking all wavelengths listed 54 on each port 48 along the selected path in the 'switch port wave-tables' FIG. 3 appropriate column 52 as 'Reserved by path creation attempt: transmission source address-transmission destination address', substituting the actual addresses for the italicized addresses; or other appropriate method that accomplishes the same usable results throughout this method. Any other appropriate method would not be outside the scope of this method; b) marking the appropriate reflective elements as reserved in the same manner in each appropriate core device 20 'reflective elements table' (not shown); and c) starting a reservation timer via a timing mechanism on the selected reserved ports. Reservation timers prevent a port from being locked out in case there is a path construction failure of any type. If the reservation timer expires, or the predetermined time limit is exceeded before the path is completed, the port is reset; as described later in this document, to an available state in the 'switch port wave-table'. 'Ghosted port path attempts' should also start their own reservation timers.

Step Seven. 78 Once a suitable path has been located and reserved, the signaling system 26 will generate a reference table by examining tables and listings, then gathering and arranging the needed information in a 'temporary switch conversion table' FIG. 4 for each core device 20 along the predetermined path across the networks core infrastructure 24. Information for each 'temporary switch conversion table' FIG. 4 will be gathered or compiled from three sources: a) the first is the 'access path wave-table' 40 for the requesting and destination access devices; b) the second is from the core devices; each core device 20 maintains its own 'switch port wave-table' FIG. 3; this table shows all wavelengths listed 54 supported on each port 48 of the given core device 20 referenced 46, and which ones are in use, or reserved at any given time. Used wavelengths in the table are marked as 'in use' in the appropriate column 52 by listing the addresses of the two access devices currently utilizing it in order of: Tx source address-Tx destination address, substituting the actual addresses for the italicized addresses; or other appropriate method that accomplishes the same usable results throughout this method. Any other appropriate method would not be outside the scope of this method; and c) a 'conversion algorithm' in each core device 20 compiles the third source of information. This algorithm will ultimately adjust, or arrange the listings of available wavelengths 62 64 in the 'temporary switch conversion table' FIG. 4 supplied by the first two sources to show wavelengths and/or wavelength conversions that can be accomplished between the listed ports 60 given the technology of each core device 20 referenced 58 and the usage of the available reflective elements. The "conversion algorithm" itself is outside the scope of this patent, and its operation and calculations are dependant on the construction of the core device 20 that the algorithm is executing upon. The 'conversion algorithm' will be unique to the construction of the core device 20 it is executed upon, and is therefore outside the scope of this method.

The information gathered and arranged in the 'temporary switch conversion table' FIG. 4 generated for each core device 20 referenced 58 will show which ingress 62 and egress 64 core spectrum wavelengths, or wavelength conversion combinations, are unused and can be supported across the chosen ports 60 in each core device 20 along the chosen possible transmission path of the current path creation attempt. The 'temporary switch conversion table' FIG. 4 is generated in three steps: a) the 'temporary switch conversion tables' FIG. 4 for core devices connected to access devices will list the available 'core spectrum wavelengths', transmit or receive as appropriate, from the 'access path wave-tables' 40 for the ports connected to access devices 22; b) the 'temporary switch conversion tables' FIG. 4 for all remaining switches in the chosen path will list all reserved wavelengths for the associated ports; c) the "conversion algorithm" will adjust the listings as previously described dependant upon the technology of the given device.

If this is a 'ghosted port path attempt' a ghost 'temporary switch conversion table' FIG. 4 should be generated and notated as appropriate to show as a ghost copy of the table 56. This table is generated as listed above using information from 'ghosted port path attempt' copies of wave-tables; from the appropriate ports for the current path creation attempt marked as having a 'ghosted port path attempt' in progress.

This entire step (seven) 78 can be summarized as searching tables or lists for information regarding needed available resources to begin calculation of a communication path.

Step Eight. (FIG. 7) 80 Compare all 'temporary switch conversion tables' FIG. 4 from each core device 20 in order of the port usage across the optical network infrastructure from the transmission source port of the requesting access device 22 to the destination receive port on the destination access device 22. Attempt to create a transmission path from the requesting access device 22 to the destination access device 22 using the minimum number of wavelength conversions along the way.

Attempt to utilize wavelengths in the each device starting with the lowest numbered wavelength and work toward the higher numbered wavelengths, any method of numbering wavelengths is acceptable. If this is a 'ghosted port path attempt', try to utilize wavelengths in the each device starting with the highest numbered wavelength and work toward the lowest number wavelength. This method will increase the probable success rate of the 'ghosted port path attempt'. Any process of utilizing wavelengths to accomplish the intended results is acceptable and is not outside the scope of this method.

The path calculation process is executed by: a) attempting to use wavelengths 62 64 that do not require any conversions to other wavelengths, such as a setting that will allow the same wavelength entering a core device 20 referenced 58 as will be exiting the same core device 20; b) start with the core device 20 port attached to the access device 22 that requested the path creation attempt and find a wavelength or wavelength conversion combination for that core device 20 that has an egress 64 port wavelength that the next devices ingress 62 port will accept; c) continue this along the entire route of the current path attempt to the destination access device 22; note all possibilities and choose the one that requires the least number of wavelength conversions. Choosing the path that requires the least number of wavelength conversions should be the most efficient path. If more than one path is located with the same minimum number of conversions, one may be selected at random, or one may be selected based on resources utilized by the network given its technology.

If a successful path cannot be calculated: a) abort the path attempt and reset all tables to their previous state with the exception of the 'ghosted port path attempt' identifier, do not modify 'ghosted port path attempt' indicators 32 50 56 on any involved port. If an involved port was showing as having a 'ghosted port path attempt' in progress during the aborted path attempt it should continue showing as such. If an involved port was not showing as having a 'ghosted port path attempt' in progress during the aborted path attempt, it should continue to show as such; b) if the aborted path attempt is a 'ghosted port path attempt', remark any involved ports that were marked as having a 'ghosted port path attempt' in progress as not having a 'ghosted port path attempt' in progress, and discard any copies of ghosted wave-tables from this attempt; c) return to step six 76 and attempt the same process along a different path; d) after a given number of attempts, return an appropriate error message to the users' application or process that initiated the original path creation request and terminate the path creation attempt.

This step (eight) 80 can be summarized as creating at least one possible optical communication path between a plurality of devices. This is done by referencing at least one possible previously selected path from a list of at least one possible previously selected path(s); then examining information in the tables or listings of each necessary device along at least one of the possible previously selected paths to determine at least one optical path for each possible previously selected path. This is done by using optical wavelengths supported by device ports along the possible previously selected path(s) with egress wavelengths that can be accepted by the next directly attached devices ingress port. Then either be directed directly through, or converted to another acceptable optical wavelength, to the next directly attached devices ingress port in the possible previously selected paths and choosing an optical path that requires the least amount of resources and optical wavelength conversions.

Step Nine. 82 Once a successful transmission path is calculated: a) check all appropriate tables of each device to see if wavelengths in appropriate ports are still reserved for the current path attempt; b) wavelengths used in the path should be marked as "In Use by Destination Address: Address" in each 'access path wave-table' 40 substituting the actual addresses for the italicized addresses; or other appropriate method that accomplishes the same usable results throughout this method. Any other appropriate method would not be outside the scope of this method; c) reflective elements used in the path should be marked in the same stated manner in the appropriate 'reflective elements tables' (not shown); d) the 'switch port wave-table' FIG. 3 in each switch along the chosen path should mark the used wavelength(s) on the utilized ports 48 by listing in the 'in use', or other appropriate column 52, the addresses of both access devices utilizing it in order of: transmission access device address-reception access device address (this notation is the name of the connection) substituting the actual addresses for the italicized addresses; or other appropriate method that accomplishes the same usable results throughout this method. Any other appropriate method would not be outside the scope of this method.

If the reservation timer, or ghost reservation timer, on any reserved port has expired, or the predetermined time limit is exceeded during any of the previous steps: a) abort the path attempt and reset all tables to their previous state with the exception of the 'ghosted port path attempt' identifier 32 50 56, if any involved port was showing as having a 'ghosted port path attempt' in progress during the aborted path attempt, it should continue showing as such; if any involved port was not showing as having a 'ghosted port path attempt' in progress during the aborted path attempt, it should continue to show as such; b) if the aborted path attempt is a 'ghosted port path attempt', remark any involved ports as not showing a 'ghosted port path attempt' in progress, and discard any copies of ghosted wave-tables from this attempt; c) restart the path creation attempt at step three.

If the calculated path is a 'ghosted port path attempt' : a) wait until the primary path connection is complete and listed in the 'connection list' (not shown) (step eleven), or has been aborted; b) check to see if wavelengths in the calculated path are still available on the selected ports. This may be necessary if the ghosted port path attempt had to wait for the 'primary path attempt' to complete; and c) remark the involved ports showing as having a 'ghosted port path attempt' in progress as not showing as having a 'ghosted port path attempt' in progress in the appropriate tables; d) the 'ghosted port path attempt' now becomes a 'primary path attempt', continue as such at the beginning of step nine.

If the calculated path is a 'ghosted port path attempt' the 'primary path attempt' has not been completed and listed in the 'connection list' or has not been aborted, wait a given amount of time and try again a given number of times. If, after an appropriate number of retry attempts have expired, the 'primary path attempt' is still not listed in the 'connection list': a) abort the connection attempt; b) remark the involved ports showing as having a 'ghosted port path attempt' in progress as not showing as having a 'ghosted port path attempt' in progress in the appropriate tables; c) discard any ghosted copies of any involved wave-tables; d) begin again at step three 70.

Step Ten. 84 All unused wavelengths in this path attempt, in all 'access path wave-tables' 40, 'reflective elements tables' (not shown), and all 'switch port wave-tables' tables' FIG. 3, should be remarked as being available by removing any reservation indicia or by replacing them with any indicia as deemed appropriate that will accomplish the intended results usable throughout this method; such other indicia are not outside the scope of this method.

Step Eleven. (FIG. 8) 86 Once the path has been successfully created, it should be listed in the 'connection list' (not shown), then the appropriate device hardware should be commissioned to begin function of the calculated communication path or connection and any reservation timers associated with this connection attempt should now be terminated. The 'connection list' should show: a) the name of the path. This name is shown by listing the optical network address of the access device 22 the path was built from, and the optical network address of the access device 22 the path was built to, in order of transmit to receive; b) the route of the path, this is shown by describing the route in terms of switch# (port) to switch# (port). For example: core device 1 (port2 to port5) to core device 10 (port 11 to port 7) etc. or by any indicia as deemed appropriate that will accomplish the intended results, such other indicia are not outside the scope of this method.

Step Twelve. 88 Once the path has been completed, the signaling system 26 should queue the original requesting access device 22 (if capable of such) to send a small test message or test pattern to the destination access device 22 (if capable of receiving test messages or patterns) via the newly established transmission path.

The test message may or may not contain the source access device 22 and the destination access devices optical network addresses, and a notation stating that it is a test message. If only the intended receiving access device 22 receives the test message successfully, then the transmission connection has been successfully established. If the test message is not received correctly, or is received by other unintended access devices, the connection should be torn down, all involved tables should be reset to their previous state and the connect attempt should begin at step two. If the involved access devices do not support test messaging or any similar method of this intended testing, simply skip this step.

Step Thirteen. 90 If the requested communication path was a two-way point-to-point communication path then once the current path is successfully established and completed from the requesting access device 22 to the destination access device 22, return to step six and proceed with the creation of another path. This new path creation attempt will be built from the destination access device 22 back to the requesting access device 22; this is done in exactly the same manner; the only difference is in starting with the destination access device 22 instead of the requesting access device 22. The procedures should be followed exactly the same while now considering the previous destination access device 22 as the current source or requesting access device 22.

If the requested communication path was a one-way point-to-point communication path then returning to step six is not necessary.

Once one or both paths have been successfully created, the signaling system 26 will notify the users' application or process in the original requesting device that the connection is available for use and will be turned over for use by the users' application(s).

Transmission paths may be built one at a time from requesting access device 22 to destination access device 22, then vise-versa building a transmission path from the destination device back to the requesting device thereby creating a two-way communications path between devices; alternatively, transmission paths may be created simultaneously from each device to the other thereby creating a two-way communications path. However, building transmission paths simultaneously may not be desirable; creating transmissions paths one at a time may be more desirable in order to prevent 'collisions'. If the signaling system 26 attempted to build transmission paths to both access devices at the same time, there would likely be many instances when opposing path attempts try to utilize the same resources at the same time while building individual paths, this would lead to 'collisions' resulting in corrupted tables, not to mention wasting resources from having to retry path attempts over and over.

Establishing a Point-To-Multipoint One-Way Communications Path Between Two or More Access Devices:

Creating a point-to-multipoint path is very similar to creating a point-to-point path. This procedure or process shows only the needed changes to the previous point-to-point path process. All rules including reservation timers and port ghosting still apply but are not discussed simply because it would be redundant. The flowcharts in FIGS. 9–12 detail the complete process without omission.

Step One. (FIG. 9) 92 The application or process executing on the users' interface device sends a request through the access device 22 to the signaling system 26 to establish a one-way point-to-multipoint connection or path to one or more acceptable addresses.

Step Two. 94 The signaling system 26 receives the requested destination addresses and translates if necessary.

Step Three. 96 The signaling system 26 then checks the 'access path wave-table' 40, and any ghost copies of the =1 access path wave-table' 40, of the requesting device to see if there is already a suitable connection or path creation attempt in progress to the destination access devices; if there is a suitable existing connection or path creation attempt in progress, instruct the requesting access device 22 to use it.

Step Four. 98 The signaling system 26 checks to see if any of the requested destination addresses are not available on the given network. If only some destination addresses are not available, return a suitable error on the invalid addresses to the users' application and continue with the available addresses, or if deemed desirable by some other method or reason, return a suitable error on the invalid addresses to the users' application and terminate the connection attempt. If none of the addresses are available, return suitable errors to the users' application and terminate the connection attempt.

Step Five. 100 Once it is determined that at least some destination addresses are available on the optical network and the connection attempt is to proceed, check to see if the requesting access device 22 has at least one available unreserved wavelength for transmit. Check to see if all specified destination access devices have at least one wavelength available for receive in their associated 'access path wave-tables' 40. If all needed transmit and receive wavelengths are found, attempt to reserve the associated ports on each access device 22 by marking the appropriate 'access path wave-tables' 40 and 'switch port wave-tables' FIG. 3 as noted below or by any indicia as deemed appropriate that will accomplish the intended results and is operable throughout this method; such other indicia are not outside the scope of this method.

Ports are reserved by marking all available wavelengths on all associated destination or receiving access device 22 ports as "Reserved for Broadcast from Address"; on the broadcasting or requesting access device 22 this notation is "Reserved for Broadcast to devices-address-address-address . . . " replacing the italicized text with the actual addresses as appropriate, or by any indicia as deemed appropriate that will accomplish the intended results and is operable throughout this method; such other indicia are not outside the scope of this method.

The signaling system 26 will then, from the broadcasting or requesting access device 22, locate and reserve one possible transmission path across the network to the other access devices. Starting with the reserved transmission port on the broadcasting access device 22 and end with the reserved receive ports on all receiving access devices; mark all wavelengths on each port along the path in the 'switch port wave-table' FIG. 3, as in use by notating in the proper column 52, 'Reserved by broadcast attempt: Tx source address—Tx destination address: Tx destination address: Tx destination address . . .' replacing the italicized text with the actual addresses as appropriate, or by any indicia as deemed appropriate that will accomplish the intended results and is operable throughout this method; such other indicia are not outside the scope of this method.

Step Six. (FIG. 10) 102 Once a suitable path has been located and reserved, the signaling system 26 will generate a 'temporary switch conversion table' FIG. 4 for each core device 20 along the selected path across the networks core infrastructure. The conversion algorithm that runs on each core device 20 will modify the 'temporary switch conversation table' FIG. 4 to show which wavelengths entering a core device 20 port can be split and exit, or be split/converted and exit other ports on the same core device 20.

Step Seven. (FIG. 11) 104 Compare all 'temporary switch conversion tables' FIG. 4 from each switch in order from access device 22 transmission source port to each access device 22 destination receive port. For a multicast path, there will be more 'temporary switch conversion tables' FIG. 4 generated than for a point-to-point path. To calculate a multipoint path, construct 'temporary switch conversion tables' FIG. 4 as though you were calculating multiple point-to-point paths.

Calculate point-to-point paths where you can. For example, from the broadcasting or requesting access device 22 through the network up to and including the port on the first core device 20 encountered where a branch in the broadcast must occur; then calculate point-to-point paths from each port exiting that core device 20 to the next point a branch must occur.

When all is done there should be only one broadcast or transmission wavelength leaving the broadcasting or requesting access device 22. It will be split and converted as needed through the network until it reaches each of the intended receiving access devices.

Once a successful path is calculated: Wavelengths used in the path should be marked as "In use by access device address: access device address: access device address . . . " Listing all other access device 22 addresses participating in the broadcast or connection except its own, in each 'access path wave-table replacing the italicized text with the actual addresses as appropriate, or by any indicia as deemed appropriate that will accomplish the intended results and is operable throughout this method; such other indicia are not outside the scope of this method.

The 'switch port wave-table' FIG. 3 in each core device 20 along the path should mark the used wavelength(s) on the utilized ports as 'in use' by listing the addresses of access devices utilizing it as' Tx source address—Tx destination address: Tx destination address: Tx destination address . . . "replacing the italicized text with the actual addresses as appropriate (this notation is the name of the connection), or by any indicia as deemed appropriate that will accomplish the intended results and is operable throughout this method; such other indicia are not outside the scope of this method.

All unused wavelengths in this path attempt, in all 'access path wave-tables' 40, 'reflective elements tables' (not shown), and all 'switch port wave-tables' FIG. 3, should be remarked as available by any indicia as deemed appropriate that will accomplish the intended results and is operable throughout this method; such other indicia are not outside the scope of this method.

Step Eight. (FIG. 12) 106 Once the path has been successfully completed, it should be listed in the 'connection list' (not shown).

Step Nine. 108 Once the path has been established, the signaling system 26 should queue the requesting or broadcasting access device 22 (if capable) to send a small 'test message' or 'test pattern' to the other access device 22 (if capable of receiving test messages or patterns) via the newly established path.

Step Ten. 110 Once both paths have been successfully created, the signaling system 26 will notify the users'application, or process in the original requesting device, that the connection is available for use; it will be turned over for use by the users' application(s).

Disconnecting a Path Once it is No Longer Needed:

Once a given path is no longer needed for communication, or needs to be discontinued for any reason, it should be disconnected. This process is accomplished by:

Step One. Locate the path in the connection list (not shown) by name. Reference the core device and ports used to create the path.

Step Two. The signaling system 26 will instruct the appropriate devices to physically discontinue or decommission the wavelengths used in each port of each device participating in the path.

Step Three. Go to the 'switch port wave-table' FIG. 3 for each port shown in the connection and change the 'in use' indicator 52 for the appropriate wavelengths to 'available' by any indicia as deemed appropriate that will accomplish the intended results and is operable throughout this method; such other indicia are not outside the scope of this method.

Step Four. Go to the 'reflective elements table' (not shown) for each port shown in the connection and change the 'in use' indicator for the appropriate elements to 'available' by any indicia as deemed appropriate that will accomplish the intended results and is operable throughout this method; such other indicia are not outside the scope of this method.

Step Five. Go to the 'access path wave-table' 40 for each port shown in the connection and change the 'in use' indicator 34 for the appropriate wavelengths to 'available' by any indicia as deemed appropriate that will accomplish the intended results and is operable throughout this method; such other indicia are not outside the scope of this method.

Step Six. Decommission and return any reflective elements used in this path to a neutral unusable state if possible; based on the technology of the given core device 20, it may not be possible to do this without disturbing other paths.

Step Seven. Remove the path and all related information from the 'connection list' (not shown).

Conclusion, Ramifications, and Scope:

This concludes the detailed description of this method of establishing communications in an all optical wavelength division multiplexed network.

Thus the reader will see that the method described in this method provides a new manner in which to utilize the technology for which this method applies to produce a superior optical communication infrastructure. Furthermore, a number of advantages of this method of establishing communications in an all optical wavelength division multiplexed network are:

- in allowing for communications utilizing other technologies that produce given wavelengths. For example, analog and digital communication methods, as well as any other technology that can produce a given supported wavelength can be supported.
- the absence of an OEO conversion, and the presence of a generic carrier supplied by this method, make it possible for communications to be carried out at any speed or bit rate.
- inherent security for individual communications since individual communications on given wavelengths are not affected by other communication on other given wavelengths.
- being backward compatible with existing optical communication technologies by utilizing this method as a generic carrier.
- reducing or removing additional information, or overhead from the user data to facilitate, identify, or track the users' communication or data across the given network infrastructure; therefore providing a more efficient communication path.

While my above description contains many specificities, these should not be construed as limitations on the scope of the method, but rather as an exemplification of one embodiment thereof. Other variations are possible. For example this method could be utilized in a free-space optical transmission network, that does not utilize fiber-optic cable as a medium, instead utilizing an open space environment as the medium for optical transmission.

Accordingly, the scope of the method should be determined not by the embodiment(s) described or illustrated, but by the appended claims and their legal equivalents.

I claim:

1. A method of establishing communications in an all optical wavelength division multiplexed network comprising the steps of:

providing a plurality of optically interconnected communication devices; in which at least one of said plurality of optically interconnected communication devices is capable of at least one of the following:

(a) converting a given optical wavelength to at least one other differing given optical wavelength in a manner that allows said given optical wavelength to remain in an optical state during said converting, (b) directing a given optical wavelength through an ingress and egress means in a manner that allows said given optical wavelength to remain in an optical state during said directing;

providing a plurality of edge devices optically interconnected to said plurality of optically interconnected communication devices, said plurality of edge devices serving the purpose of either creating a place of ingress for an external communication to traverse said plurality of optically interconnected communication devices, or creating a place for an external communication to egress having already ingressed and traversed said plurality of optically interconnected communication devices;

providing a communication means by said plurality of edge devices and said optically interconnected communication devices utilizing a set or multiple sets of given optical wavelengths from the electromagnetic spectrum as a carrier to facilitate said communication;

providing a control capable of commissioning and decommissioning said plurality of optically interconnected communication devices resources and or said plurality of edge devices resources as necessary;

providing a method for said control to receive a request for a commissioning or decommissioning of one or more all optical communications paths between a plurality of given said edge devices;

providing a plurality of differing tables or listings comprising table information: availability, status, functionality, usage, capabilities, facilities;

storing said table information;

creating an all optical communication path and or carrier by one or more of the following:

creating a unidirectional optical communications path between any two of said plurality of edge devices comprising the steps of;

(a) examining said table information to locate usable resources between said any two of said plurality of edge devices, (b) commissioning said usable resources in a manner that will guide a given wavelength, or a one after another combination of differing wavelengths from said set or multiple sets of given optical wavelengths from an optical egress means of the first of said two of said plurality of edge devices through said plurality of optically interconnected communication devices to an optical ingress means of the second of said two of said plurality of edge devices thereby establishing an optical carrier between said any two of said plurality of edge devices for unidirectional use by an external communication method, creating a bidirectional optical communications path between arty two of said plurality of edge devices comprising the steps of:
(a) creating a said unidirectional optical communications path between any two of said plurality of edge devices, then
(b) repeating said creating a said unidirectional optical communications path in the opposite direction between the same two said any two of said plurality of edge devices thereby establishing multiple optical carriers between said any two of said plurality of edge devices for bidirectional use by an external communication method, creating a unidirectional point to multipoint or broadcast optical communications path between any number of said plurality of edge devices comprising the steps of:
(a) examining said table information to locate usable resources between said number of said plurality of edge devices,
(b) commissioning said usable resources in a manner that will guide either a given wavelength, or a one after another combination of differing wavelengths from said set or multiple sets of given optical wavelengths from an optical egress means of one of said plurality of edge devices through said plurality of optically interconnected communication devices to an optical ingress means of the remaining plurality of said plurality of edge devices thereby establishing an optical carrier between a plurality of devices for unidirectional point to multipoint or broadcast use by an external communication method, whereby said method will provide a means of establishing communication between a plurality of edge devices that allows for digital and or analog communication, and further, is transparent to the speed, or bit rate of any communication;

whereby said method will provide a means of establishing communication that allows said digital and or said analog communication to be undetectable to other said digital and or said analog communications in said method;

whereby said method will provide a means of establishing communication that is transparent to any given protocol.

2. A method as claimed in claim 1 further comprising a timer that will time the creation and commissioning of a communication path and or carrier to allow for a corrective means to be executed if a predetermined time limit is exceeded.

3. A method as claimed in claim 1, further comprising a means of secondary process by executing the step of said creating an all optical communication path and or carrier during the execution of said creating an all optical communication path and or carrier, and by identifying the execution of said means of secondary process in said table information, and further generating additional copies of said table information for use by said means of secondary process.

4. A method as claimed in claim 1 comprising a table or listing comprising a device and or device subpart network address or identifier, status of said means of secondary process, and port usage information comprising one or more port addresses or identifiers, and optical wavelength identifiers of wavelengths that are usable across one or more ingress and egress means of said device and or device subpart with or without conversions to differing wavelengths.

5. A method as claimed in claim 1 comprising a table or listing comprising a device and or device subpart network address or identifier, status of said means of secondary process, indicia indicating one or more optical wavelengths that are usable on said device and or device subpart, and usage status of said optical wavelengths on said device and or device subpart.

6. A method as claimed in claim 1 comprising a table or listing comprising an edge device and or edge device subpart port address or identifier, status of said means of secondary process, and a listing of wavelengths usable by said edge device and or edge device subpart arranged in a manner that indicates the ability of one of more of said plurality of optically interconnected communication devices to convert one or more given optical wavelengths used by said edge device and or edge device subpart to other given optical wavelengths usable by one or more of said plurality of optically interconnected communication devices.

7. A method as claimed in claim 1 comprising a table or listing comprising an edge device or device subpart network address or identifier, and part usage information comprising port address or identifier, status of said means of secondary process, and a listing of wavelengths usable by said edge device and or edge device subpart arranged in a manner that indicates the ability of one of more of said plurality of optically interconnected communication devices to convert one or more given optical wavelengths used by said edge device and or edge device subpart to other given optical wavelengths usable by one or more of said plurality of optically interconnected communication devices.

8. A method as claimed in claim 1 wherein the step of said creating a unidirectional optical communications path between any two of said plurality of edge devices may be executed comprising:
(a) referencing one or more possible previously selected paths from a predetermined list of one or more possible previously selected paths,
(b) examining said table information for available resources in each device along each said possible previously selected paths,
(c) determining if a usable all optical path can be commissioned, utilizing said available resources, along each said possible previously selected paths; said available resources include optical wavelengths supported by all device ports along each said possible previously selected paths with egress wavelengths that can be accepted by the next directly attached devices ingress port, and either be directed through and egress, or be converted to a differing optical wavelength acceptable to the next directly attached devices ingress port then egress,
(d) choosing an optical path that requires the least amount of resources and or wavelength conversions,
(e) commissioning said available resources along said optical path that requires the least amount of resources and or wavelength conversions.

9. A method as claimed in claim 1 wherein the step of said creating a bidirectional optical communications path between any two of said plurality of edge devices may be executed comprising:
(a) executing said creating step of said creating a unidirectional optical communications path between any two of said plurality of edge devices as stated in claim 8, (b) repeating said step of said creating a unidirectional optical communications path between any two of said plurality of edge devices as stated in claim 8 in the opposite direction between the same two said any two of said plurality of edge devices.

10. A machine for establishing communication in an all optical wavelength division multiplexed network comprising:

a plurality of optically interconnected communication devices; in which at least one of said plurality of optically interconnected communication devices is capable of at least one of the following:
  (a) converting a given optical wavelength to at least one other differing given optical wavelength in a manner that allows said given optical wavelength to remain in an optical state during said converting,
  (b) directing a given optical wavelength through an ingress and egress means in a manner that allows said given optical wavelength to remain in an optical state during said directing;

a plurality of edge devices optically interconnected to said plurality of optically interconnected communication devices, said plurality of edge devices serving the purpose of either creating a place of ingress for an external communication to traverse said plurality of optically interconnected communication devices, or creating a place for an external communication to egress having already ingressed and traversed said plurality of optically interconnected communication devices;

a set or multiple sets of given optical wavelengths from the electromagnetic spectrum to be utilized as a carrier to facilitate said communication;

one or more hardware controllers capable of commissioning and decommissioning said plurality of optically interconnected communication devices resources and or said plurality of edge devices resources as necessary;

providing a method for said one or more hardware controllers to receive a request for a commissioning or decommissioning of one or more all optical communications paths between a plurality of given said edge devices;

providing a plurality of differing tables or listings comprising table information: availability, status, functionality, usage, capabilities, facilities;

one or more memories capable of storing said table information;

one or more memory controllers capable of executing at least one or more of the following:
  (a) imparting and exporting said table information to and or from said memory,
  (b) manipulating contents of said memory,
  (c) delivering instructions to said one or more hardware controllers;

said one or more memory controllers and or said one or more hardware controllers being capable of individually or in combination, executing a means of creating a communication path and or carrier by one or more of the following:

creating a unidirectional optical communications path between any two of said plurality of edge devices comprising the steps of:
  (a) examining said table information to locate usable resources between said any two of said plurality of edge devices,
  (b) commissioning said usable resources in a manner that will guide a given wavelength, or a one after another combination of differing wavelengths from said set or multiple sets of given optical wavelengths from an optical egress means of the first of said two of said plurality of edge devices through said plurality of optically interconnected communication devices to an optical ingress means of the second of said two of said plurality of edge devices thereby establishing an optical carrier between said any two of said plurality of edge devices for unidirectional use by an external communication method, creating a bidirectional optical communications path between any two of said plurality of edge devices comprising the steps of:
  (a) creating a said unidirectional optical communications path between any two of said plurality of edge devices, then
  (b) repeating said creating a said unidirectional optical communications path in the opposite direction between the same two said any two of said plurality of edge devices thereby establishing multiple optical carriers between said any two of said plurality of edge devices for bidirectional use by an external communication method, creating a unidirectional point to multipoint or broadcast optical communications path between any number of said plurality of edge devices comprising the steps of:
  (a) examining said table information to locate usable resources between said number of said plurality of edge devices,
  (b) commissioning said usable resources in a manner that will guide either a given wavelength, or a one after another combination of differing wavelengths from said set or multiple sets of given optical wavelengths from an optical egress means of one of said plurality of edge devices through said plurality of optically interconnected communication devices to an optical ingress means of the remaining plurality of said plurality of edge devices thereby establishing an optical carrier between a plurality of devices for unidirectional point to multipoint or broadcast use by an external communication method, whereby said machine will provide a means of establishing communication between a plurality of edge devices that allows for digital and or analog communication, and further, is transparent to the speed, or bit rate of any communication;

whereby said machine will provide a means of establishing communication that allows said digital and or said analog communication to be undetectable to other said digital and or said analog communications in said method;

whereby said machine will provide a means of establishing communication that is transparent to any given protocol.

11. A machine as claimed in claim 10 further comprising a timing mechanism that will time the creation and commissioning of a communication path and or carrier to allow for a corrective means to be executed if a predetermined time limit is exceeded.

12. A machine as claimed in claim 10 further comprising said memory controller capable of executing said means of creating a communication path and or carrier during the execution of said creating a communication path and or carrier, and by identifying the execution of said means of secondary process in said table information, and further generating additional copies of said table information for use by said means of secondary process.

13. A machine as claimed in claim 10 wherein said memory controller will update said table information by placing usable indicia representing said machine resource states in memory locations referenceable to corresponding locations in said table information.

14. A machine as claimed in claim 10 wherein said memory will include a table or listing comprising a device and or device subpart network address or identifier, status of said means of secondary process, indicia indicating one or more optical wavelengths that are usable on said device and or device subpart, and usage status of said optical wavelengths on said device and or device subpart.

15. A machine as claimed in claim 10 wherein said memory will include a table or listing comprising an edge device and or edge device subpart port address or identifier, status of said means of secondary process, and a listing of wavelengths usable by said edge device and or edge device subpart arranged in a manner that indicates the ability of one of more of said plurality of optically interconnected communication devices to convert one or more given optical wavelengths used by said edge device and or edge device subpart to other given optical wavelengths usable by one or more of said plurality of optically interconnected communication devices.

16. A machine as claimed in claim 10 wherein said memory will include a table or listing comprising an edge device or device subpart network address or identifier, and port usage information comprising port address or identifier, status of said means of secondary process, and a listing of wavelengths usable by said edge device and or edge device subpart arranged in a manner that indicates the ability of one of more of said plurality of optically interconnected communication devices to convert one or more given optical wavelengths used by said edge device and or edge device subpart to other given optical wavelengths usable by one or more of said plurality of optically interconnected communication devices.

17. A machine as claimed in claim 10 wherein said one or more memory controllers may determine or calculate a unidirectional optical communications path between any two of said plurality of edge devices comprising:
  (a) referencing one or more possible previously selected paths from a predetermined list of one or more possible previously selected paths,
  (b) examining said table information for available resources in each device along each said possible previously selected paths,
  (c) determining if a usable all optical path can be commissioned, utilizing said available resources, along each said possible previously selected paths, said available resources include optical wavelengths supported by all device ports along each said possible previously selected paths with egress wavelengths that can be accepted by the next directly attached devices ingress port, and either be directed through and egress, or be converted to a differing optical wavelength acceptable to the next directly attached devices ingress port then egress,
  (d) choosing an optical path that requires the least amount of resources and or wavelength conversions,
  (e) commissioning said available resources along said optical path that requires the least amount of resources and or wavelength conversions.

18. A machine as claimed in claim 10 wherein said one or more memory controllers may determine or calculate a bidirectional optical communications path between any two of said plurality of edge devices comprising:
  (a) executing said step of said creating a unidirectional optical communications
  (b) repeating said step of said creating a unidirectional optical communications path between any two of said plurality of edge devices as stated in claim 17 in the opposite direction between the same two said any two of said plurality of edge devices.

* * * * *